US012620604B2

(12) United States Patent
Sasago et al.

(10) Patent No.: US 12,620,604 B2
(45) Date of Patent: May 5, 2026

(54) FUEL CELL AND METHOD FOR PRODUCING SAME

(71) Applicant: Hitachi High-Tech Corporation, Tokyo (JP)

(72) Inventors: Yoshitaka Sasago, Tokyo (JP); Noriyuki Sakuma, Tokyo (JP); Natsuki Yokoyama, Tokyo (JP); Atsushi Unemoto, Tokyo (JP); Takashi Tsutsumi, Tokyo (JP); Aritoshi Sugimoto, Tokyo (JP); Toru Aramaki, Tokyo (JP); Nobuyuki Mise, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 742 days.

(21) Appl. No.: 17/921,019

(22) PCT Filed: May 13, 2020

(86) PCT No.: PCT/JP2020/019145
§ 371 (c)(1),
(2) Date: Oct. 24, 2022

(87) PCT Pub. No.: WO2021/229729
PCT Pub. Date: Nov. 18, 2021

(65) Prior Publication Data
US 2023/0127271 A1 Apr. 27, 2023

(51) Int. Cl.
*H01M 8/0232* (2016.01)
*H01M 8/1004* (2016.01)
*H01M 8/12* (2016.01)

(52) U.S. Cl.
CPC ....... *H01M 8/0232* (2013.01); *H01M 8/1004* (2013.01); *H01M 2008/1293* (2013.01)

(58) Field of Classification Search
CPC ............ H01M 8/0232; H01M 8/1004; H01M 2008/1293; H01M 4/86; H01M 8/02;
(Continued)

(56) References Cited

U.S. PATENT DOCUMENTS

| | | |
|---|---|---|
| 2003/0096146 A1 | 5/2003 | Foster |
| 2007/0184322 A1 | 8/2007 | Huang et al. |

(Continued)

FOREIGN PATENT DOCUMENTS

| | | |
|---|---|---|
| CN | 101099253 A | 1/2008 |
| CN | 107078328 A | 8/2017 |

(Continued)

OTHER PUBLICATIONS

An, J. et al., "Three-Dimensional Nanostructured Bilayer Solid Oxide Fuel Cell with 1.3 W/cm$^2$ at 450 ° C.", American Chemical Society, ACS Publications, Nano Lett. 2013, 13, pp. 4551-4555 (five (5) pages).

(Continued)

*Primary Examiner* — Adam A Arciero
(74) *Attorney, Agent, or Firm* — Crowell & Moring LLP

(57) ABSTRACT

A fuel cell 1 includes a silicon substrate 2, a porous support material layer 5, a plurality of holes 60 or columns 40, and a stacked body. The stacked body includes an upper electrode layer 10, a solid electrolyte layer 100 and a lower electrode layer 20. The upper electrode layer 10 is also formed on a surface parallel to a main surface of the silicon substrate 2 in a manner of being continuous to the upper electrode layer formed in the plurality of holes 60 or columns 40, or the lower electrode layer 20 is also formed on a surface parallel to the main surface of the silicon substrate 2 in a manner of being continuous to the lower electrode layer 20 formed in the plurality of holes 60 or columns 40. The stacked body is supported by the porous (Continued)

support material layer 5 in at least upper end portions and lower end portions of the plurality of holes 60 or columns 40.

14 Claims, 34 Drawing Sheets

(58) Field of Classification Search
CPC .. H01M 8/0245; H01M 8/124; H01M 8/1246; H01M 8/1253; H01M 8/2428; H01M 8/2432; H01M 8/1226; H01M 8/1213; H01M 8/12; H01M 8/1097; H01M 8/1286; Y02E 60/50; Y02P 70/50
See application file for complete search history.

(56) References Cited

U.S. PATENT DOCUMENTS

| | | |
|---|---|---|
| 2010/0310961 A1 | 12/2010 | Clark |
| 2011/0223519 A1 | 9/2011 | Kang et al. |
| 2017/0237103 A1 | 8/2017 | Choi et al. |
| 2018/0248205 A1 | 8/2018 | Funabashi et al. |
| 2018/0277855 A1 | 9/2018 | Akashi et al. |
| 2019/0237790 A1 | 8/2019 | Cavazos Sepulveda et al. |
| 2021/0408556 A1 | 12/2021 | Sakuma et al. |

FOREIGN PATENT DOCUMENTS

| | | |
|---|---|---|
| CN | 107836060 A | 3/2018 |
| CN | 109755615 A | 5/2019 |
| JP | 2002-329511 A | 11/2002 |
| JP | 2004-273213 A | 9/2004 |
| JP | 2005-509242 A | 4/2005 |
| JP | 2005-174846 A | 6/2005 |
| JP | 2005-518075 A | 6/2005 |
| JP | 2018-139186 A | 9/2018 |
| JP | 2018-163811 A | 10/2018 |
| JP | 2018-181448 A | 11/2018 |
| KR | 10-2011-0101976 A | 9/2011 |
| WO | WO 03/069705 A2 | 8/2003 |
| WO | WO 2006/072165 A1 | 7/2006 |
| WO | WO 2016/190813 A1 | 12/2016 |
| WO | WO 2020/075285 A1 | 4/2020 |

OTHER PUBLICATIONS

Chinese-language Office Action issued in Chinese Application No. 202080099981.3 dated Jun. 19, 2025 (11 pages).

Korean-language Office Action issued in Korean Application No. 10-2022-7036535 dated Jan. 23, 2025 (5 pages).

Chinese language Office Action issued in Chinese Application No. 202080099981.3 dated Jan. 24, 2025 (8 pages).

International Search Report (PCT/ISA/210) issued in PCT Application No. PCT/JP2020/019145 dated Aug. 11, 2020 with English translation (six (6) pages).

Japanese-language Written Opinion (PCT/ISA/237) issued in PCT Application No. PCT/JP2020/019145 dated Aug. 11, 2020 (four (4) pages).

Taiwanese-language Office Action issued in Taiwanese Application No. 110112855 dated Sep. 2, 2021 (three (3) pages).

Evans, A. et al., "Review on microfabricated micro-solid oxide fuel cell membranes", Elsevier, Journal of Power Sources, 194 (2009), pp. 119-129 (11 pages).

An, J. et al., "Three-Dimensional Nanostructured Bilayer Solid Oxide Fuel Cell with 1.3 W/cm$^2$at 450 ", American Chemical Society, ACS Publications, Nano Lett. 2013, 13, pp. 4551-4555 (five (5) pages).

Japanese-language International Preliminary Report on Patentability (PCT/IPEA/409) issued in PCT Application No. PCT/JP2020/019145 dated Dec. 21, 2021 (three (3) pages).

[FIG. 1]
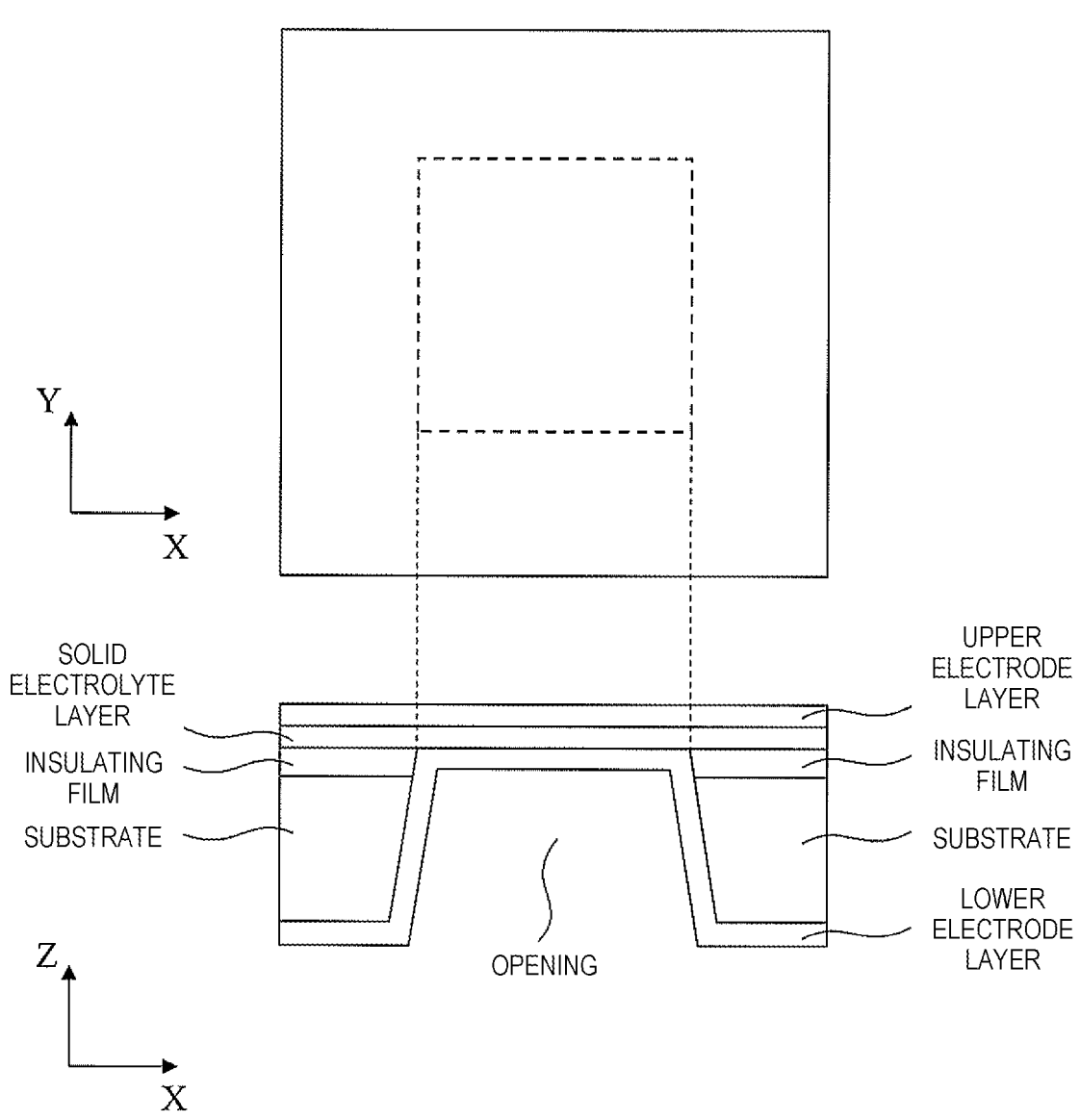

[FIG. 2]
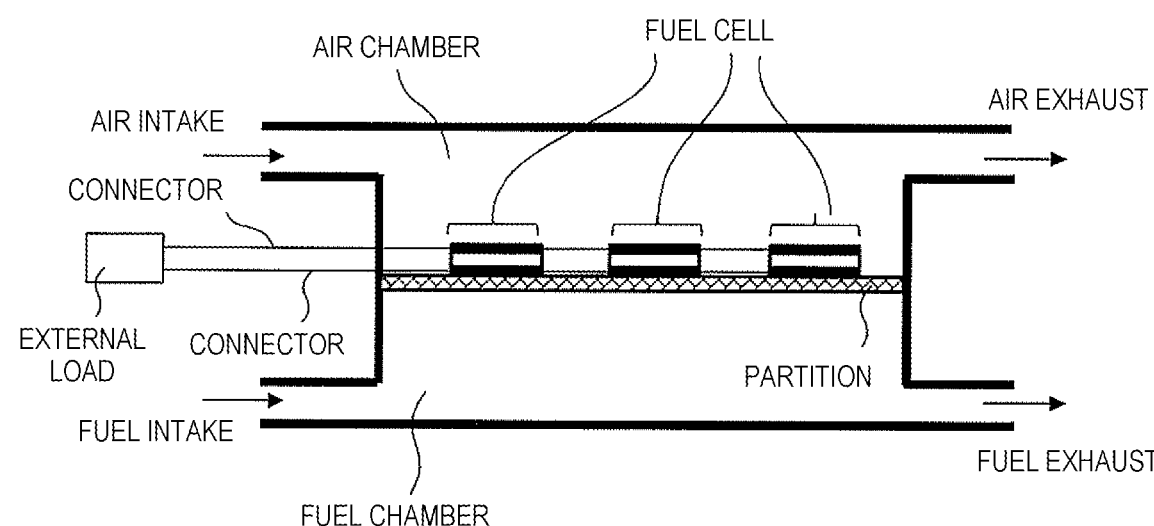
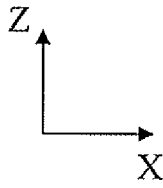

[FIG. 3]
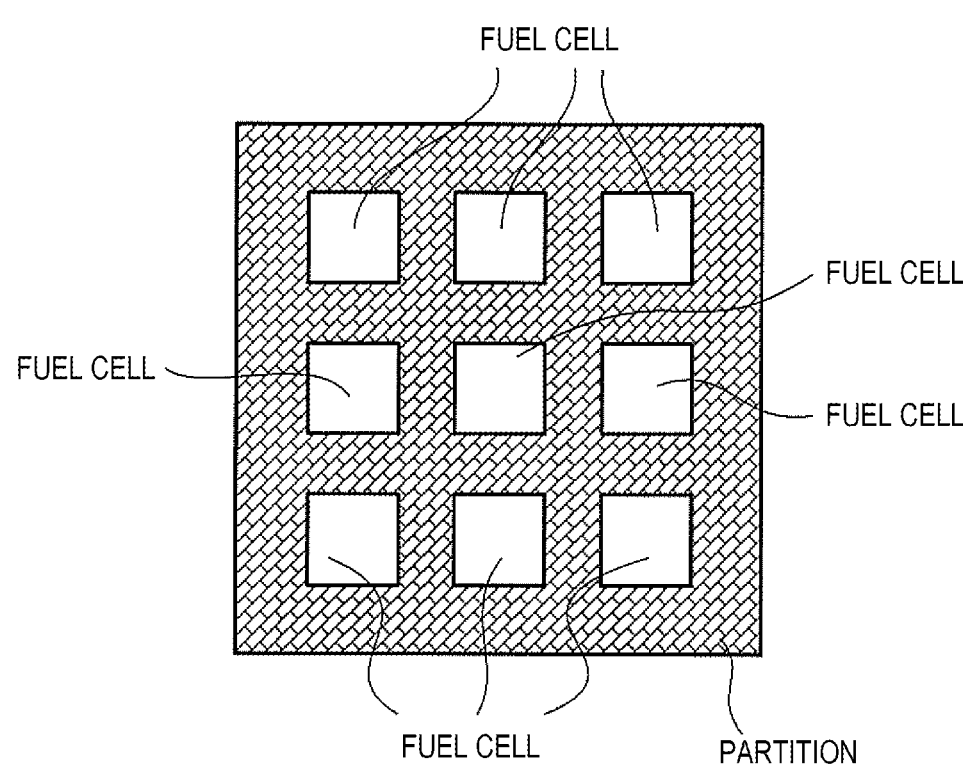
FUEL CELL
FUEL CELL
FUEL CELL
FUEL CELL
FUEL CELL
FUEL CELL
PARTITION
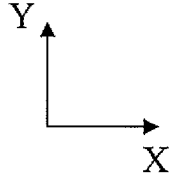

[FIG. 4]
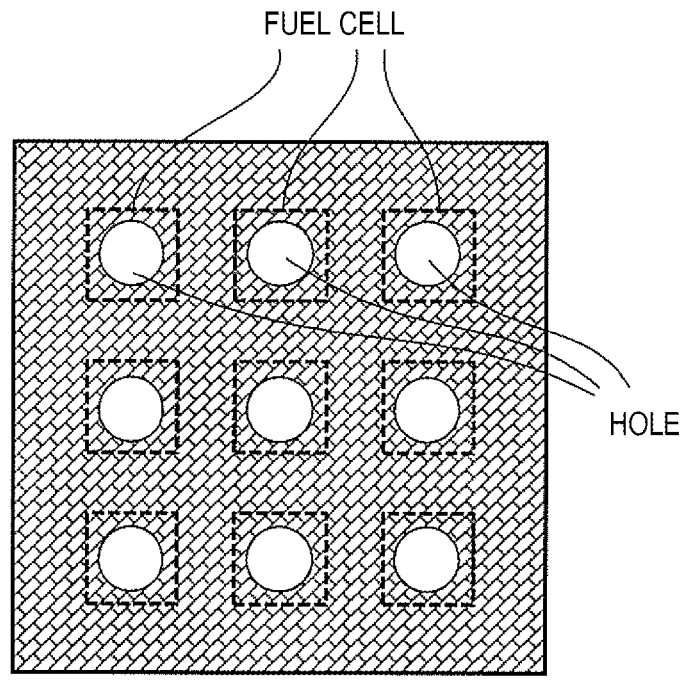
FUEL CELL
HOLE
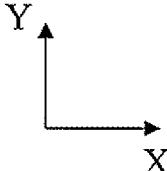
Y
X

[FIG. 5]
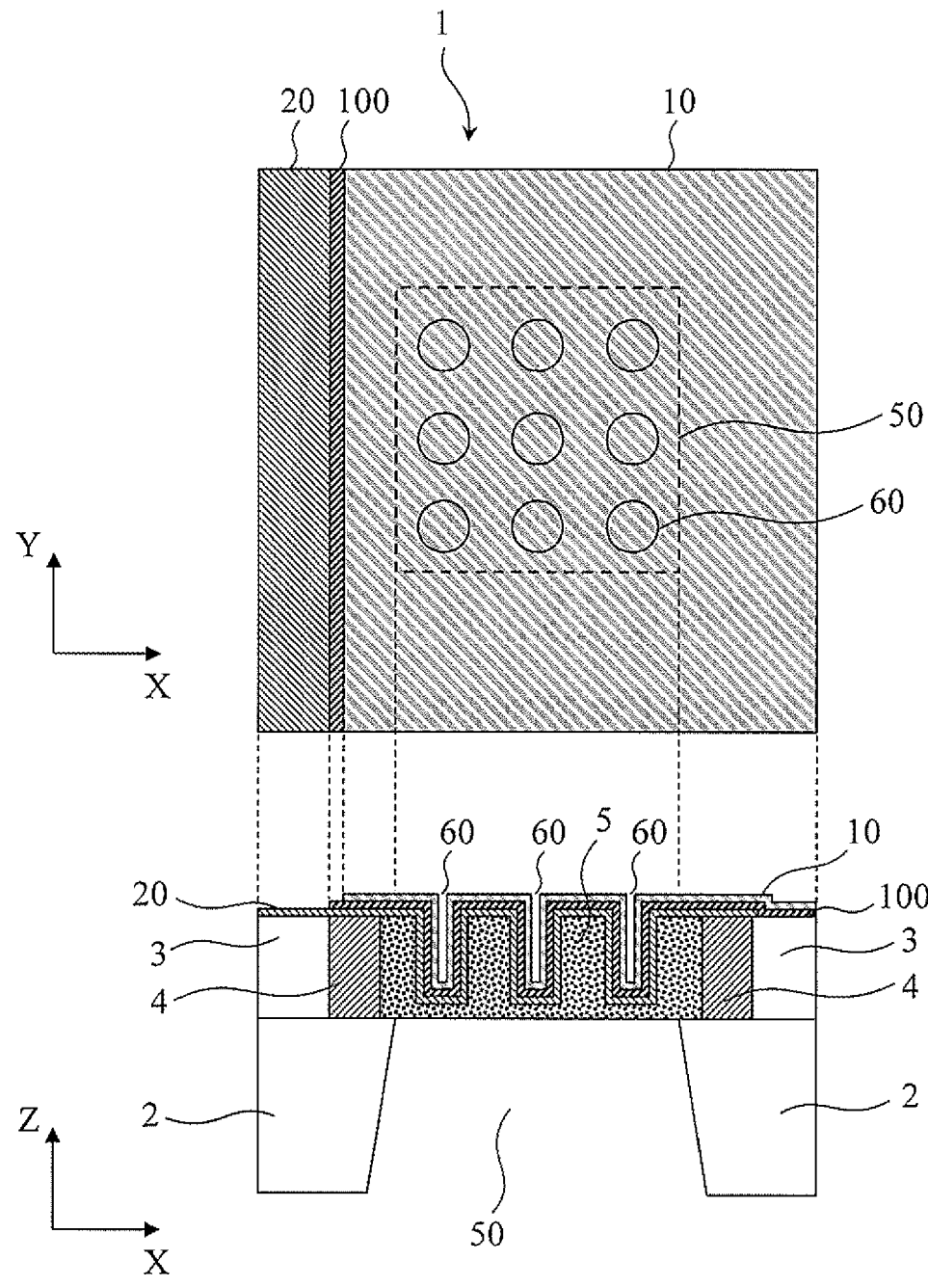

[FIG. 6]
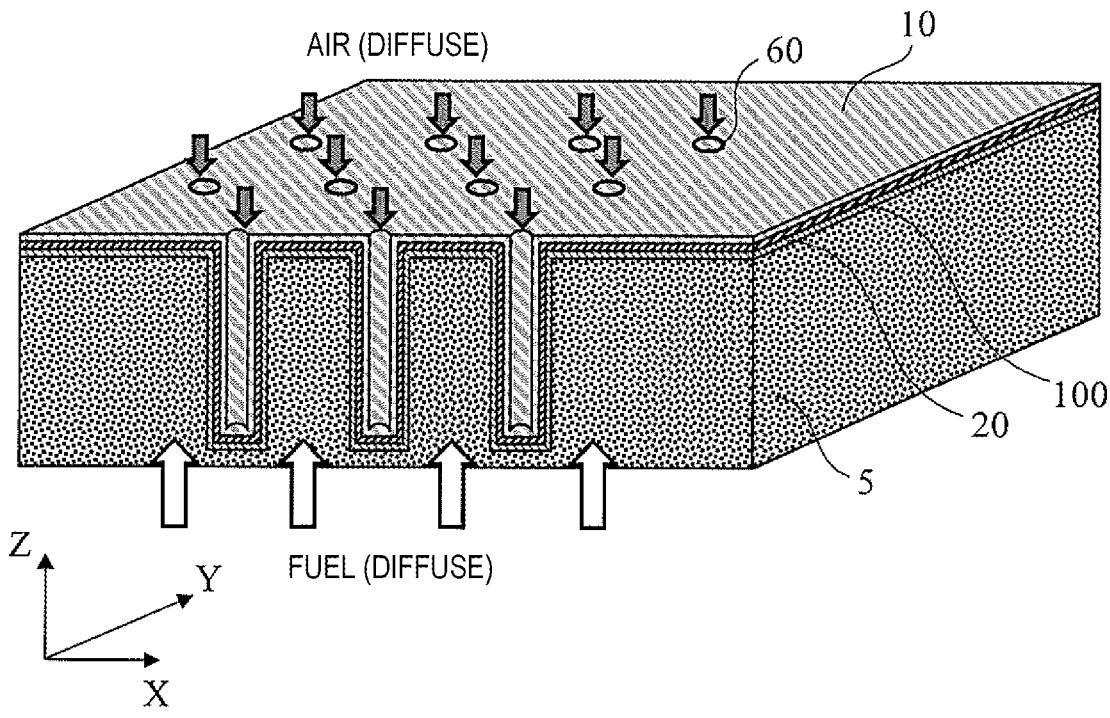
[FIG. 7]
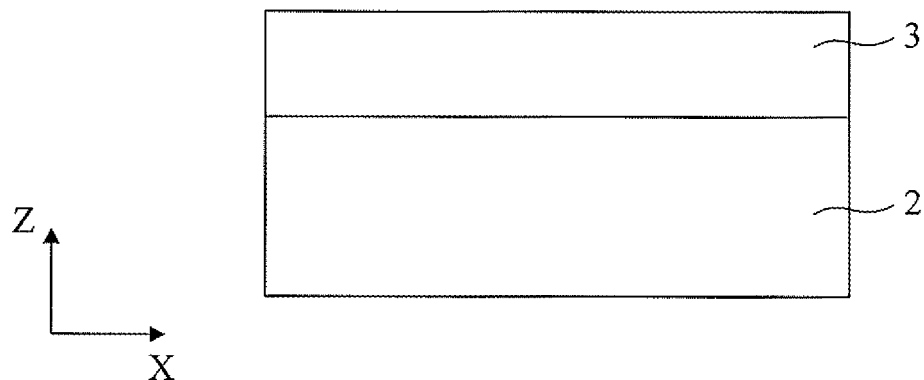

[FIG. 8]
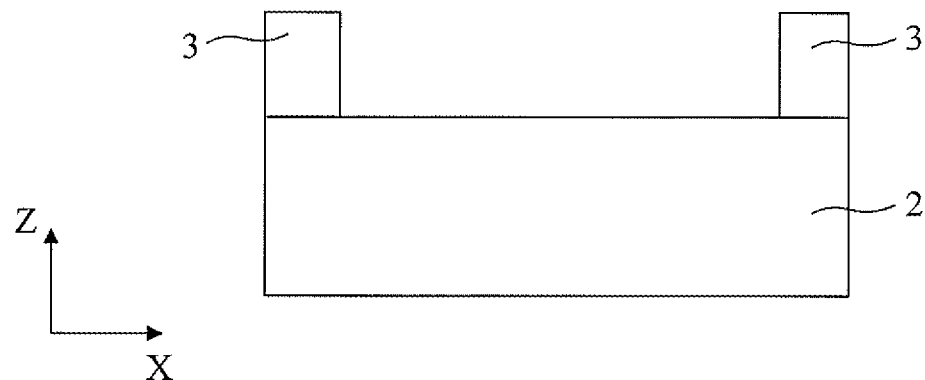
[FIG. 9]
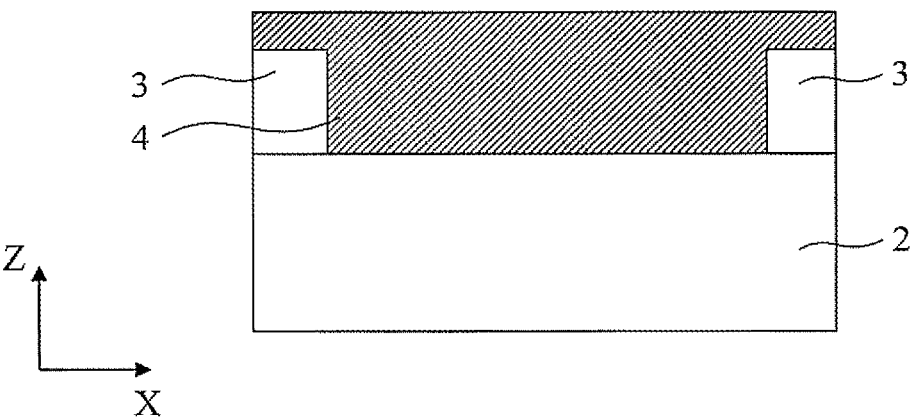

[FIG. 10]
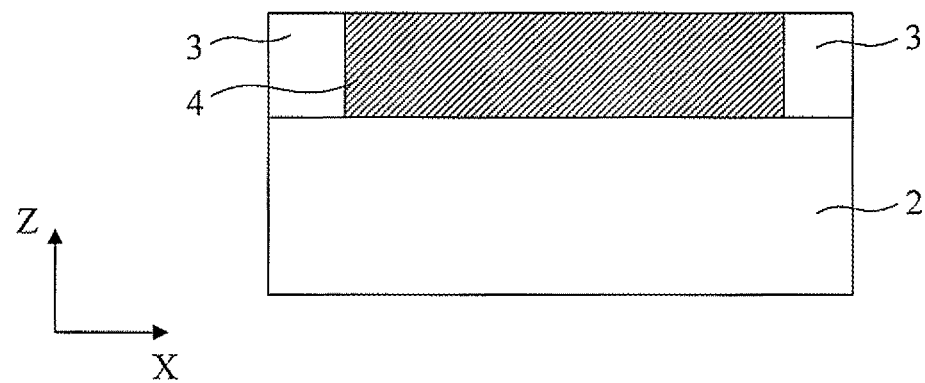
[FIG. 11]
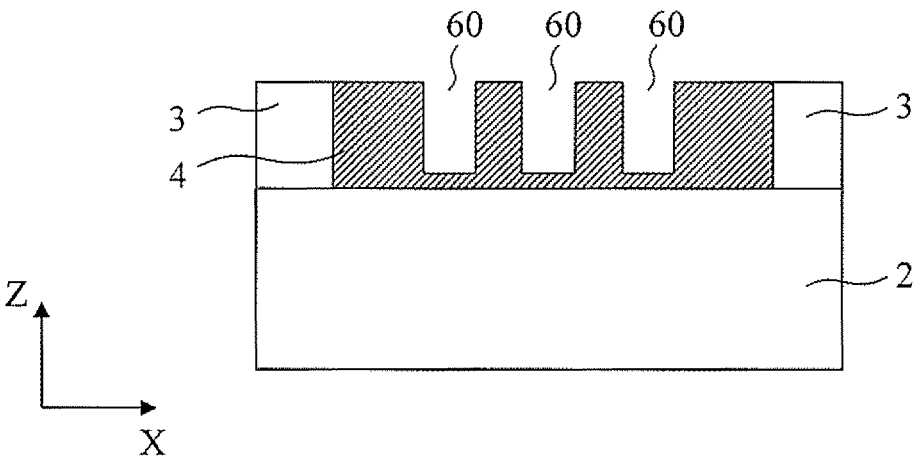

[FIG. 12]
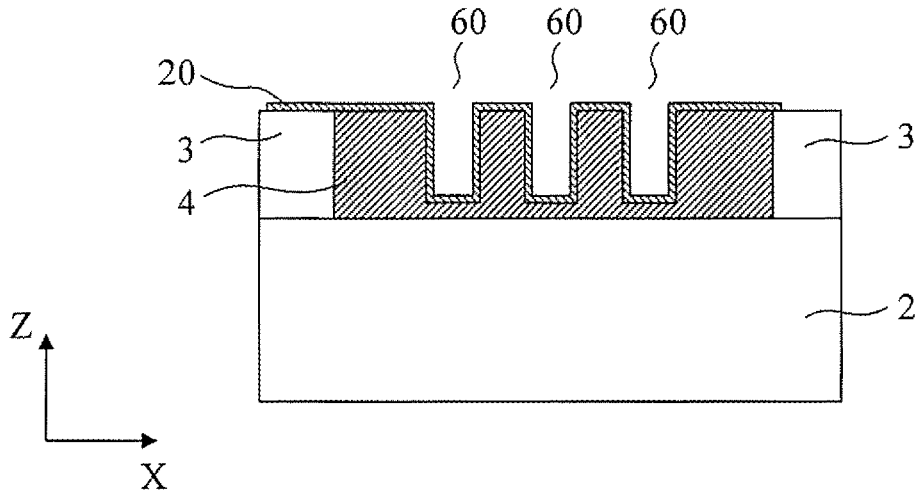
[FIG. 13]
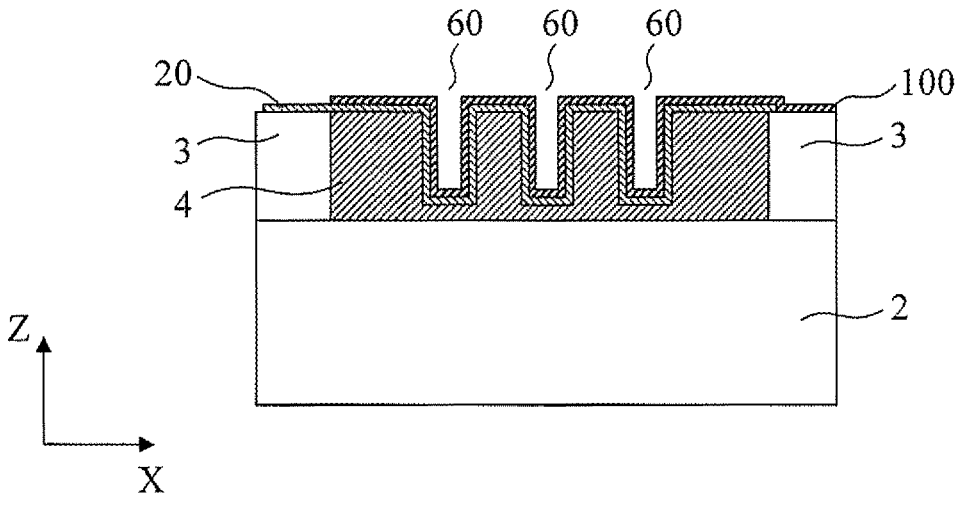

[FIG. 14]
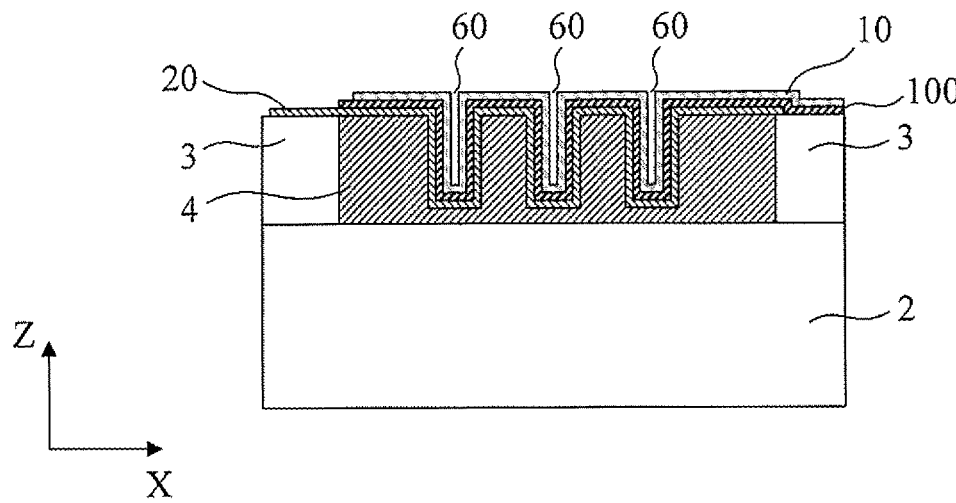
[FIG. 15]
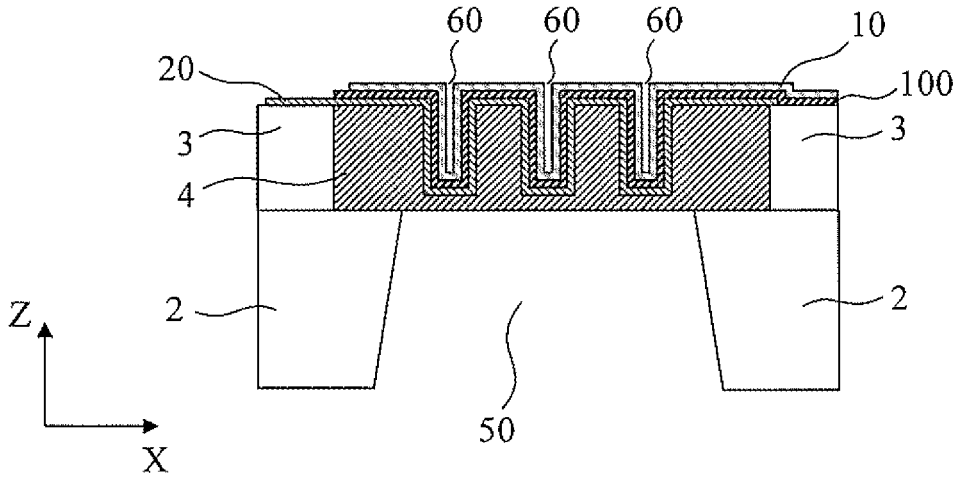

[FIG. 16]
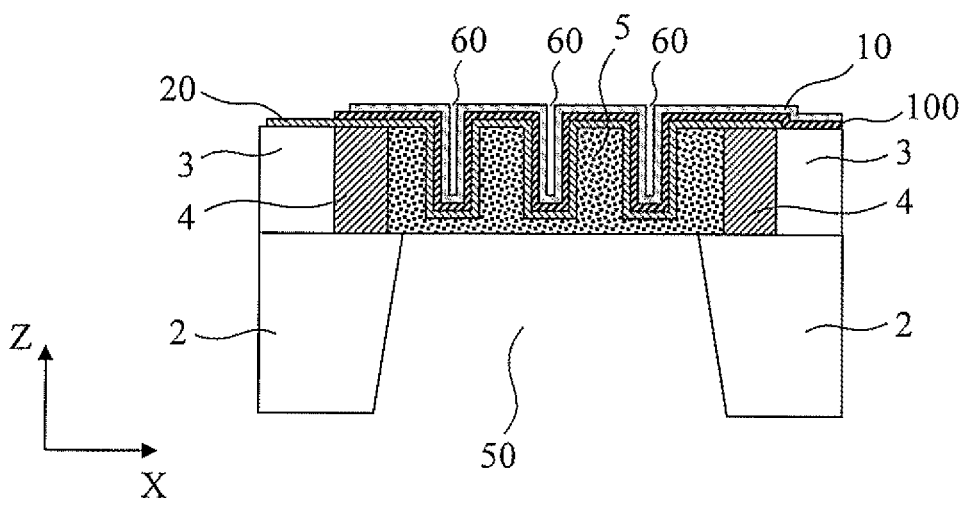

[FIG. 17]
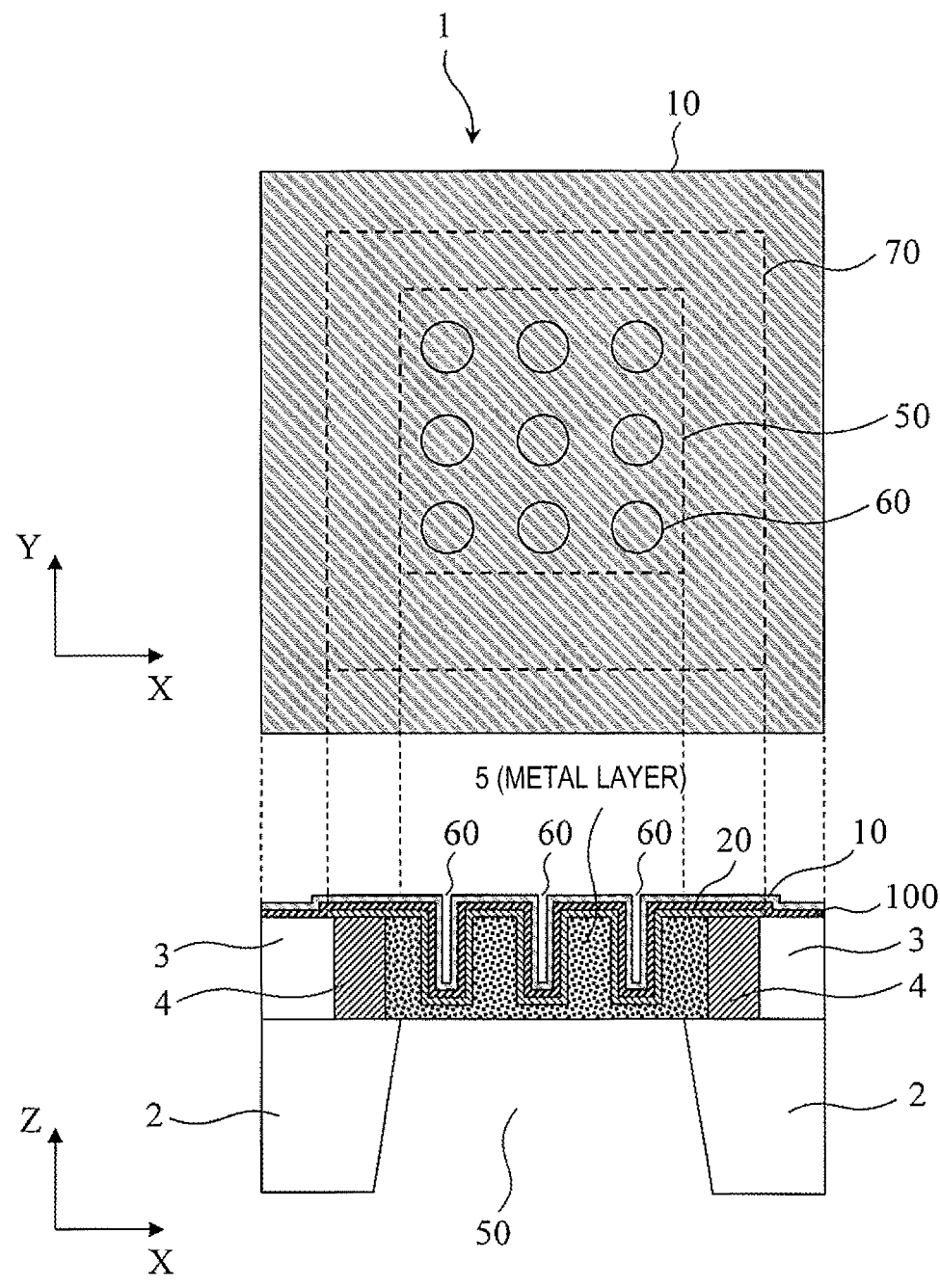

[FIG. 18]
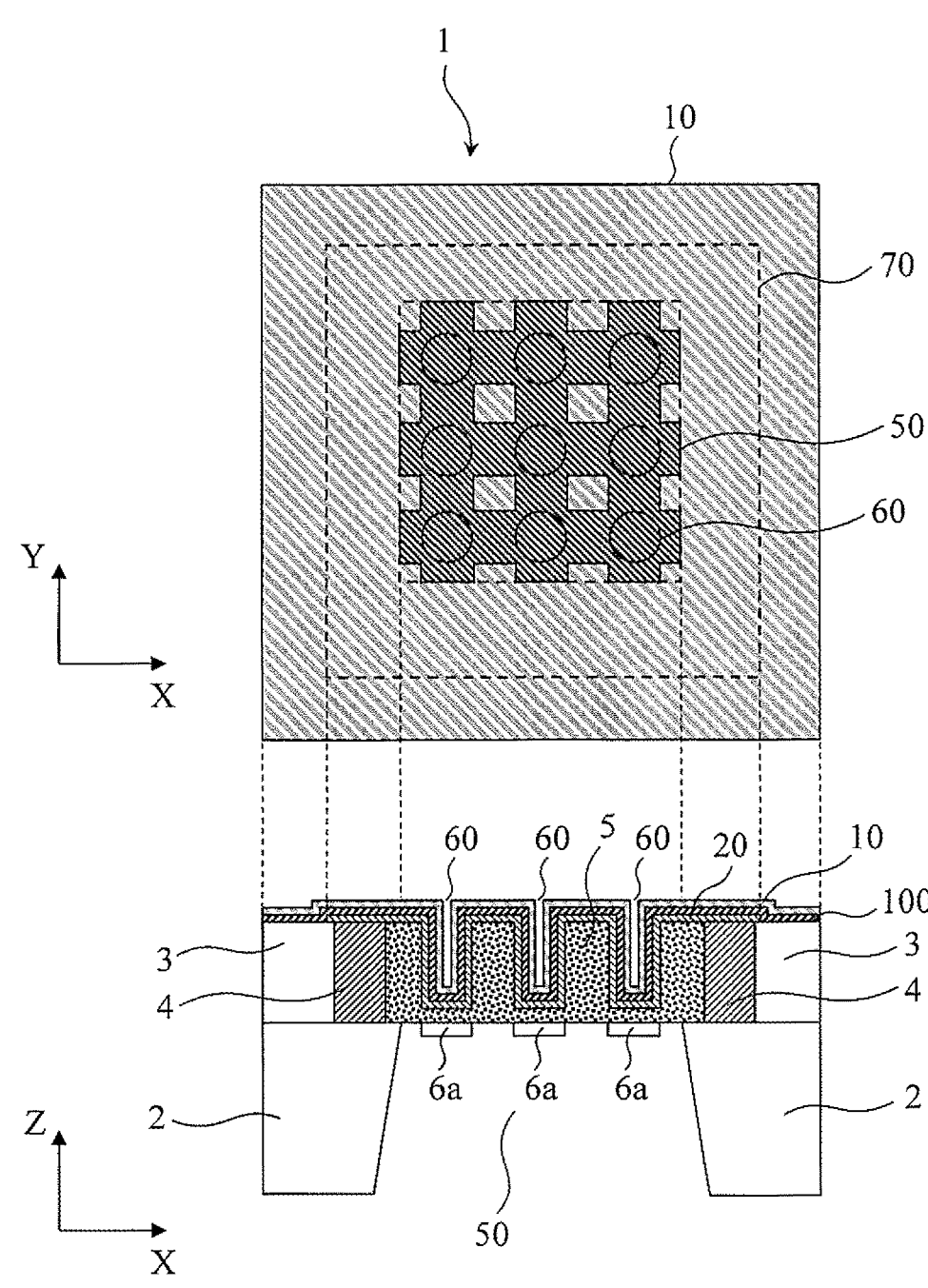

[FIG. 19]
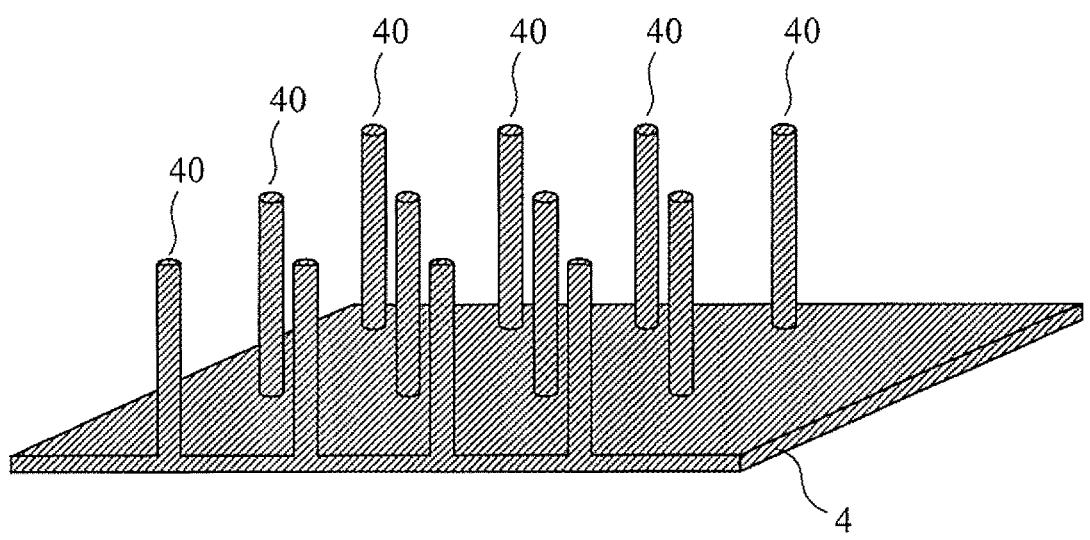
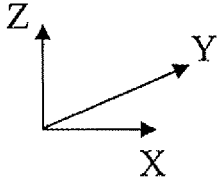

[FIG. 20]
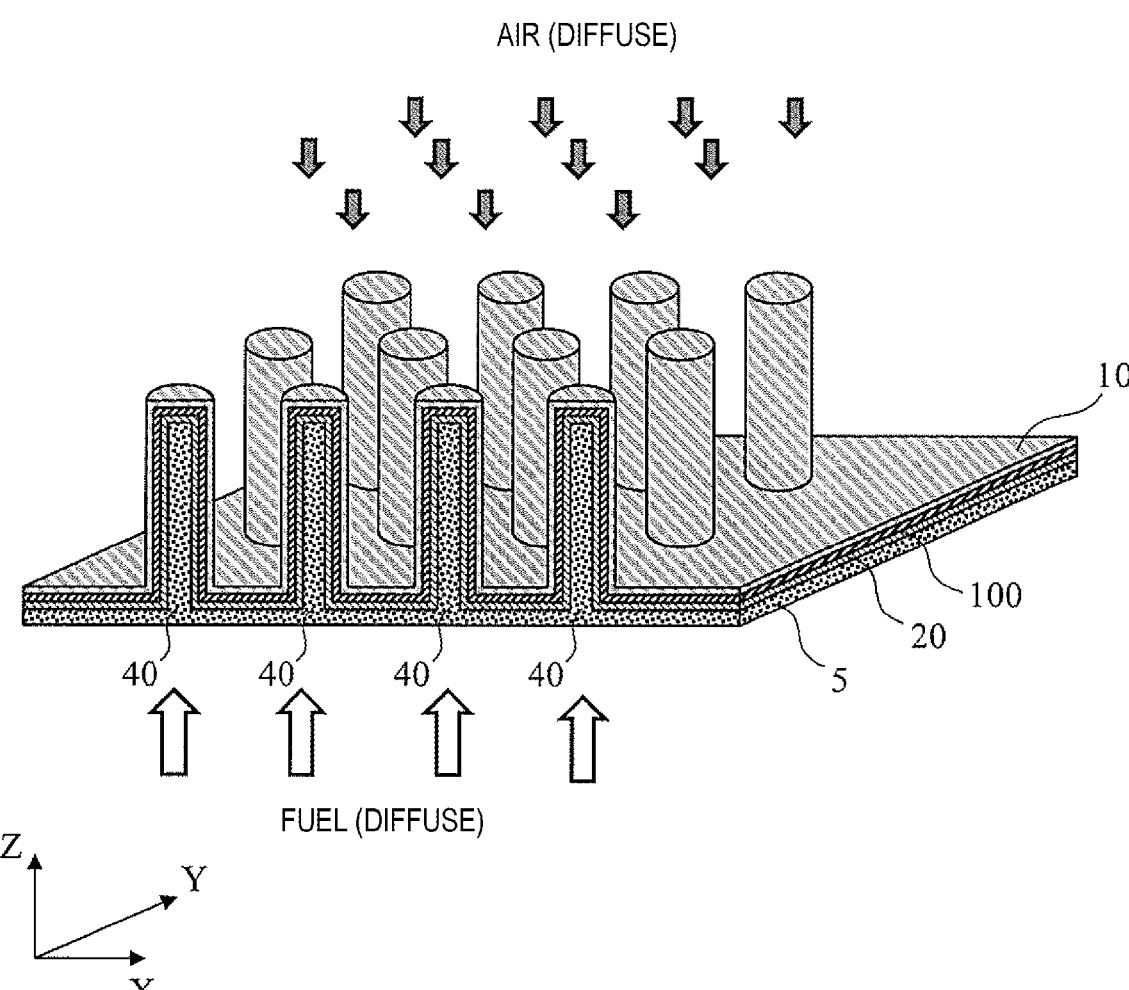

[FIG. 21]
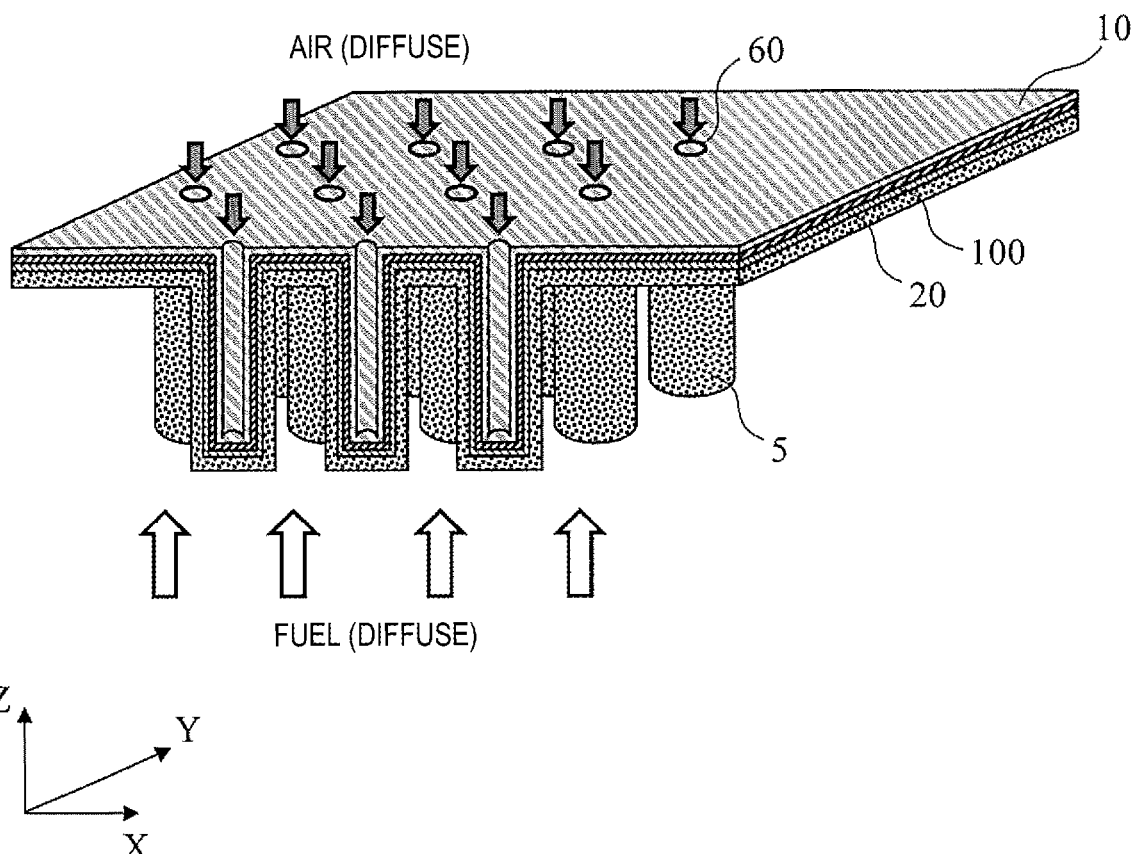

[FIG. 22]
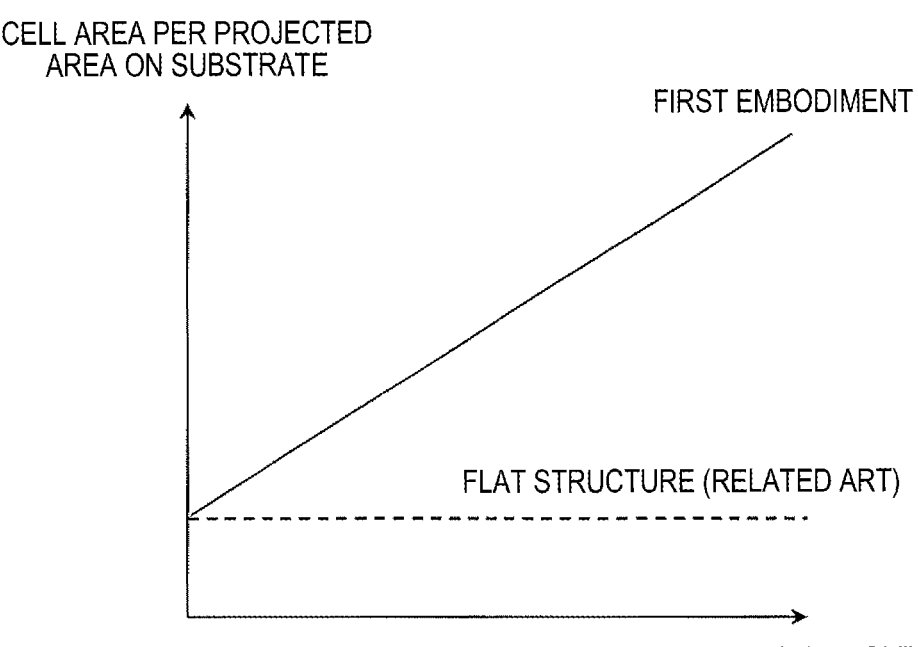

[FIG. 23]
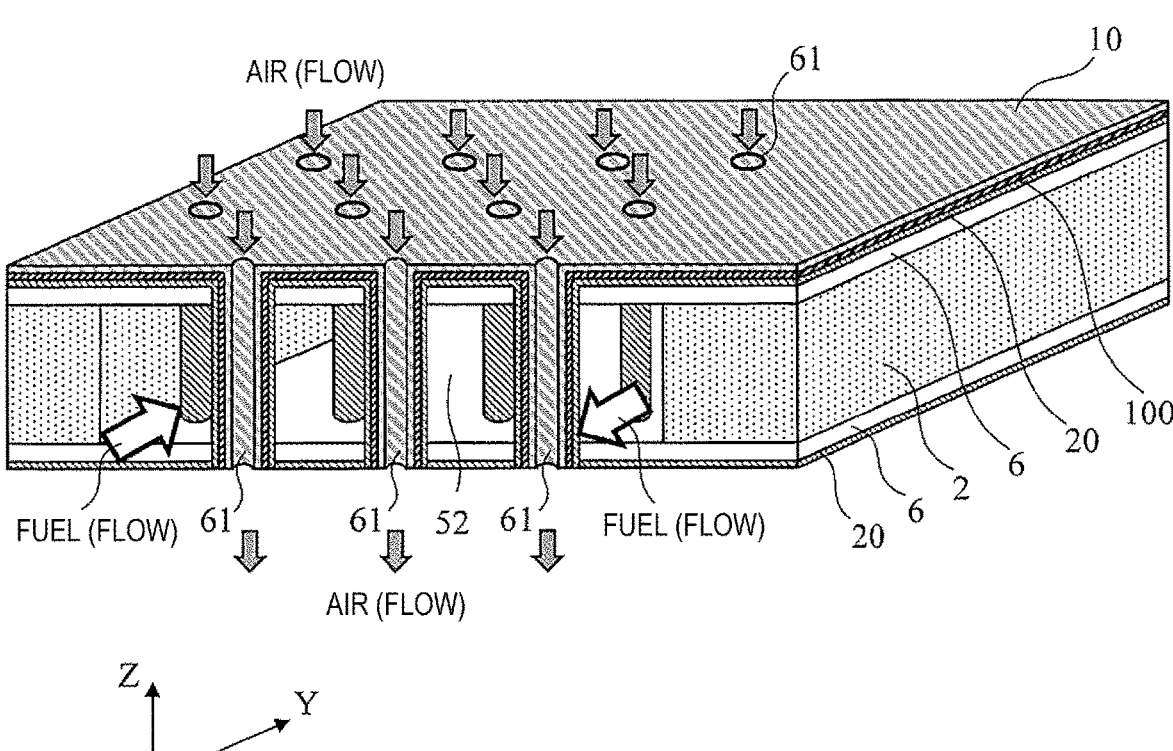
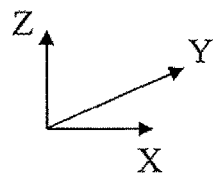

[FIG. 24]
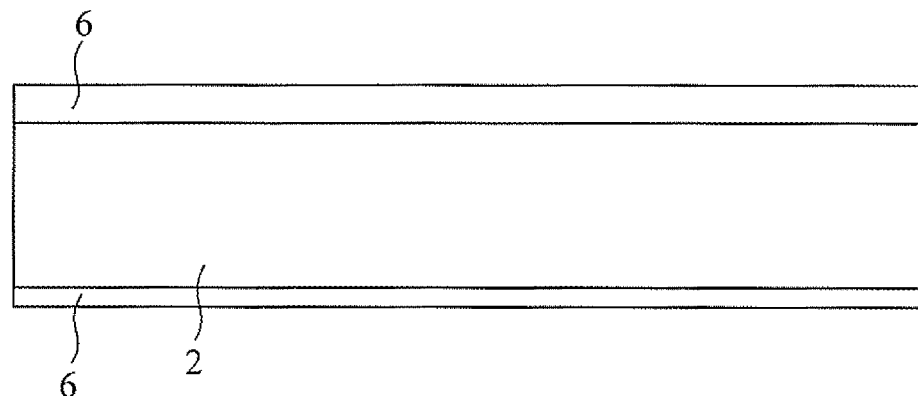
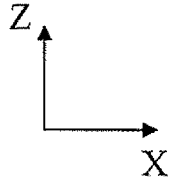
[FIG. 25]
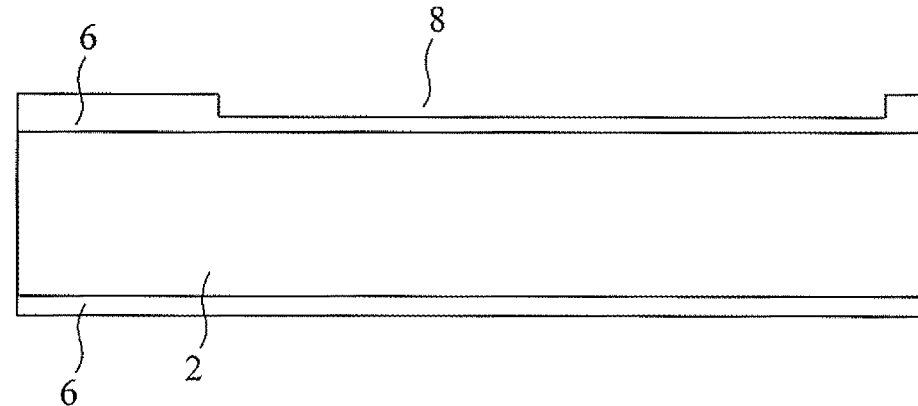
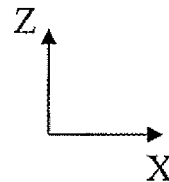

[FIG. 26]
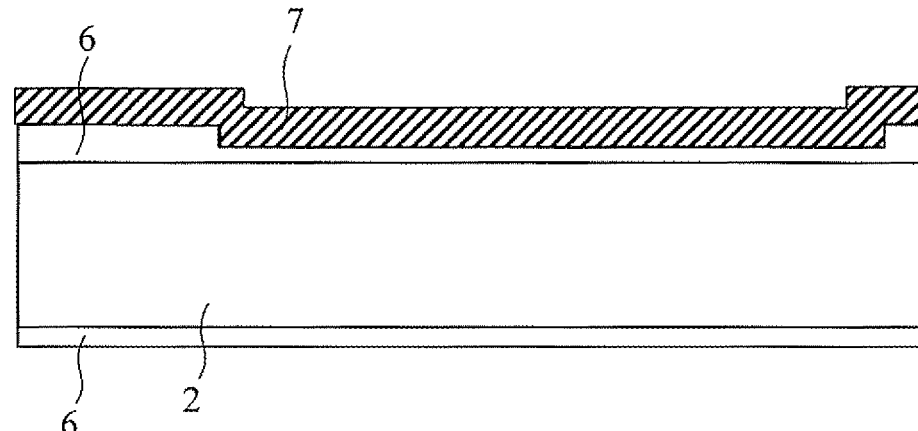
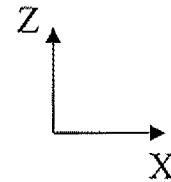
[FIG. 27]
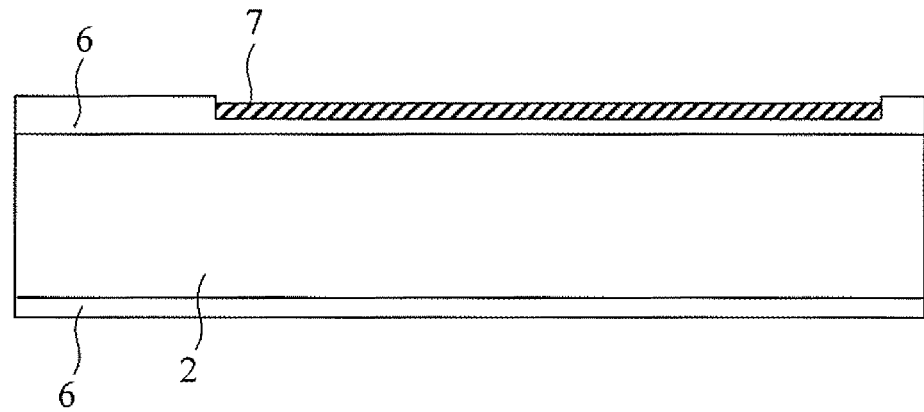
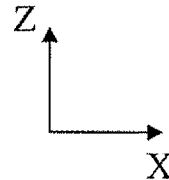

[FIG. 28]
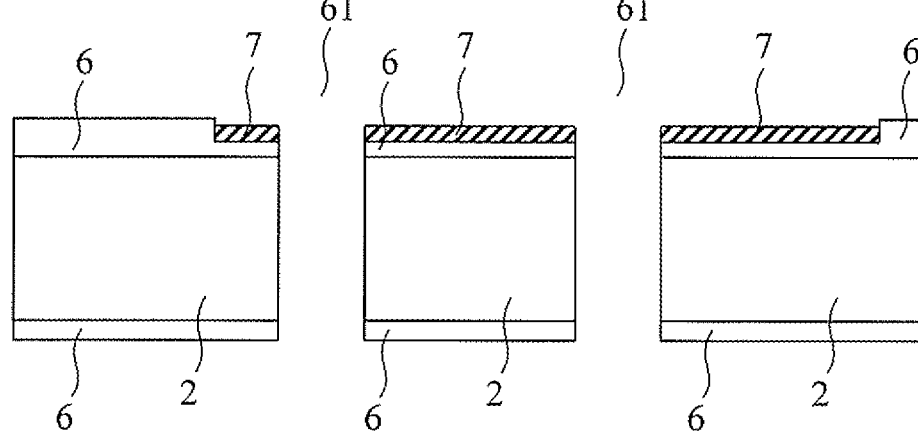
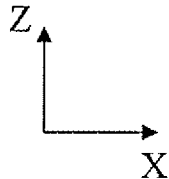
[FIG. 29]
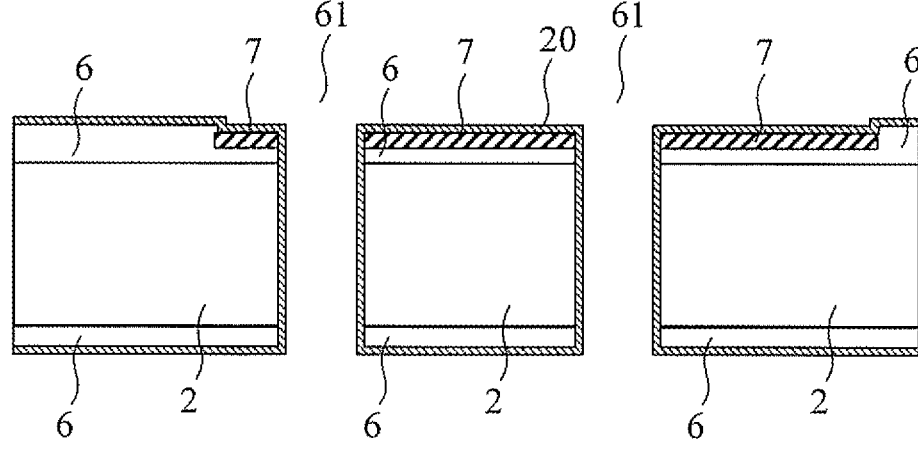
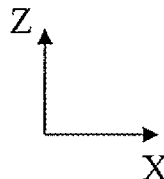

[FIG. 30]
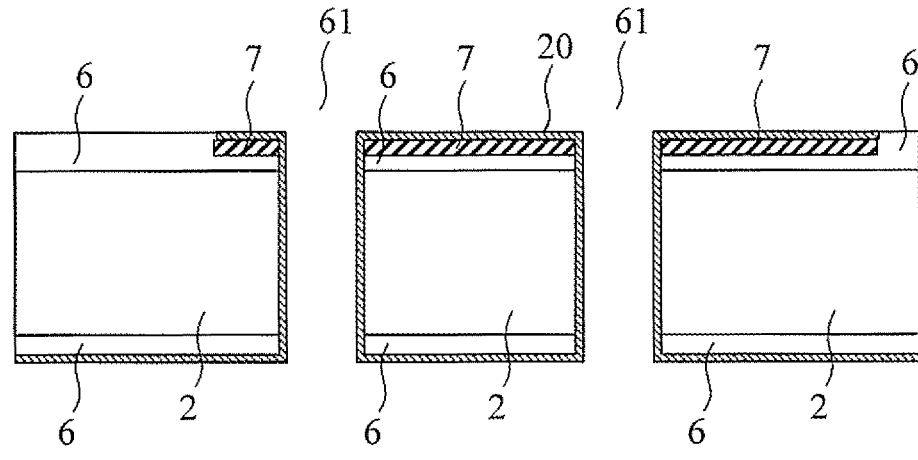
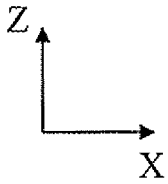

[FIG. 31]
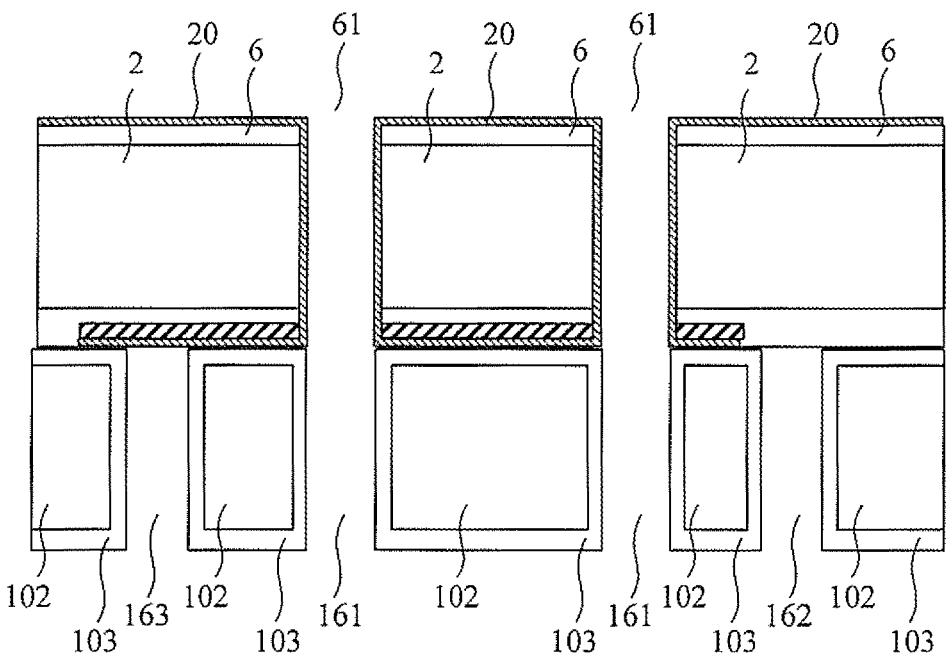
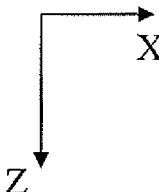

[FIG. 32]
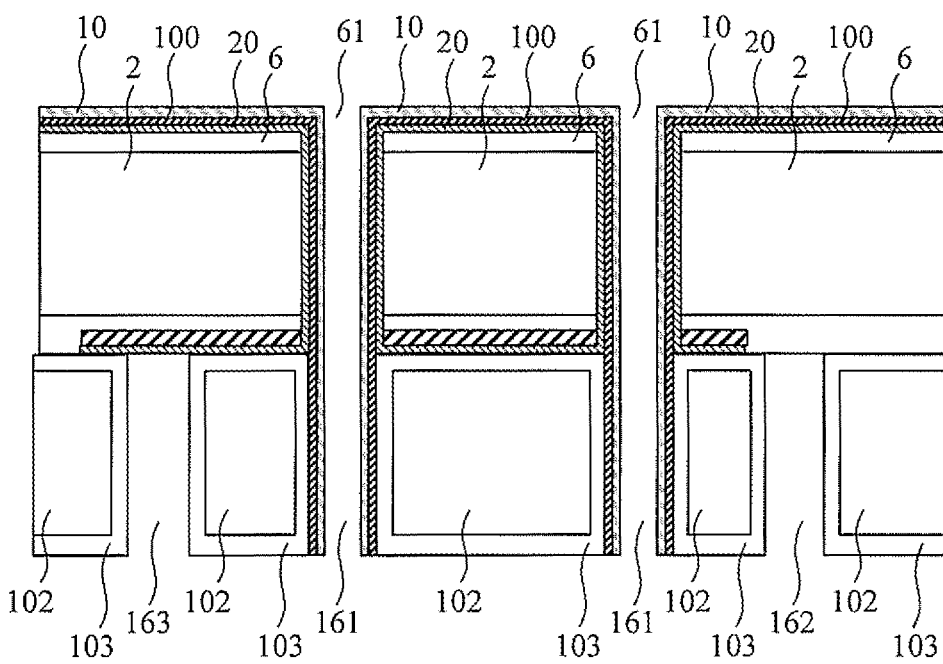
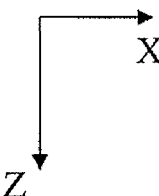

[FIG. 33]
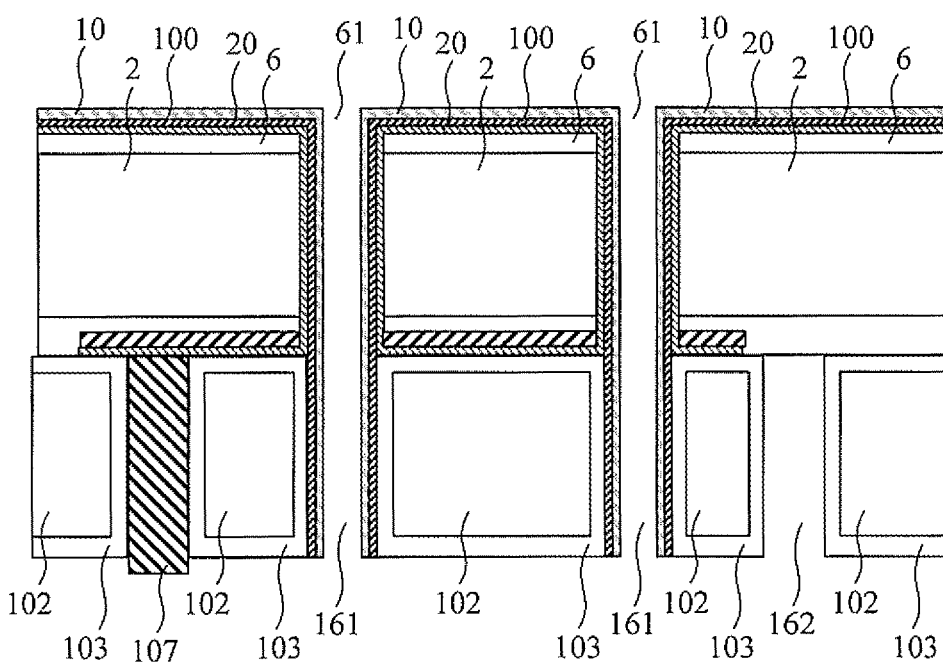
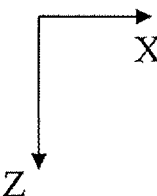

[FIG. 34]
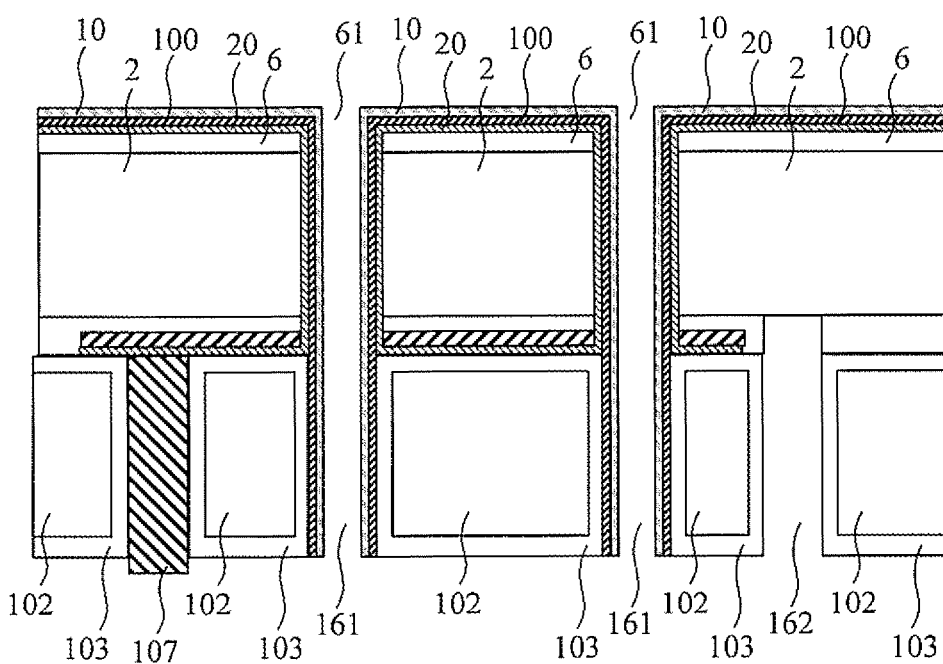
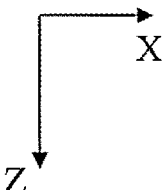

[FIG. 35]
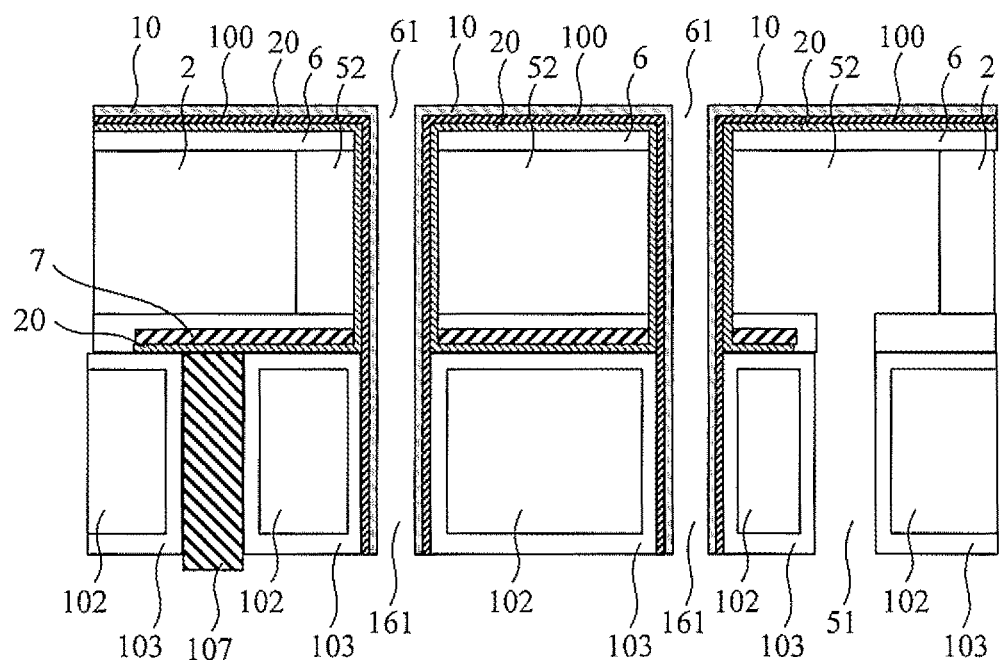
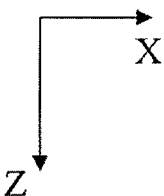

[FIG. 36]
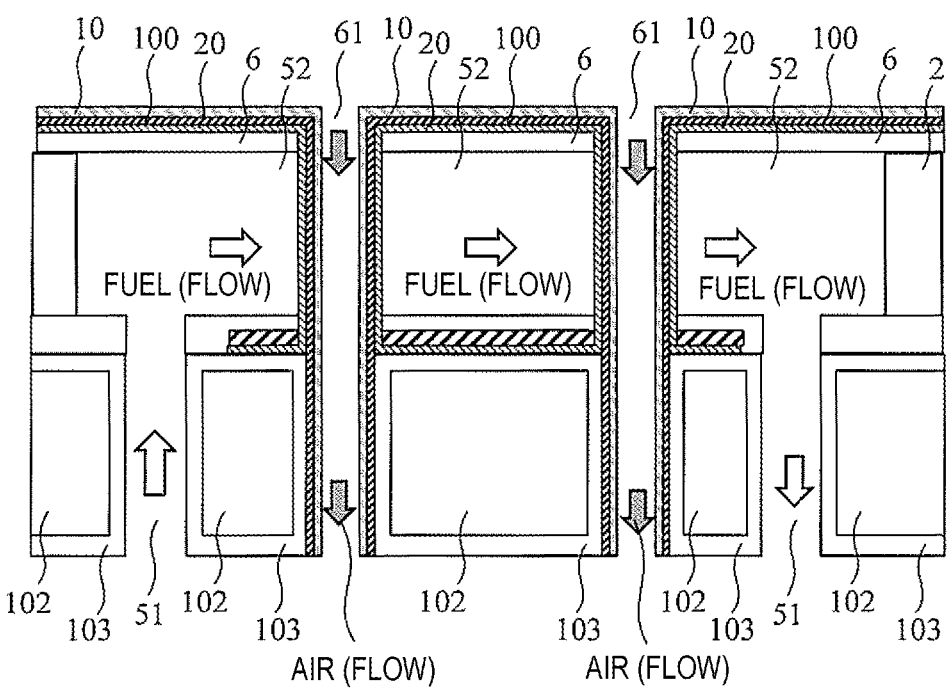
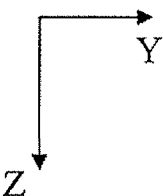

[FIG. 37]
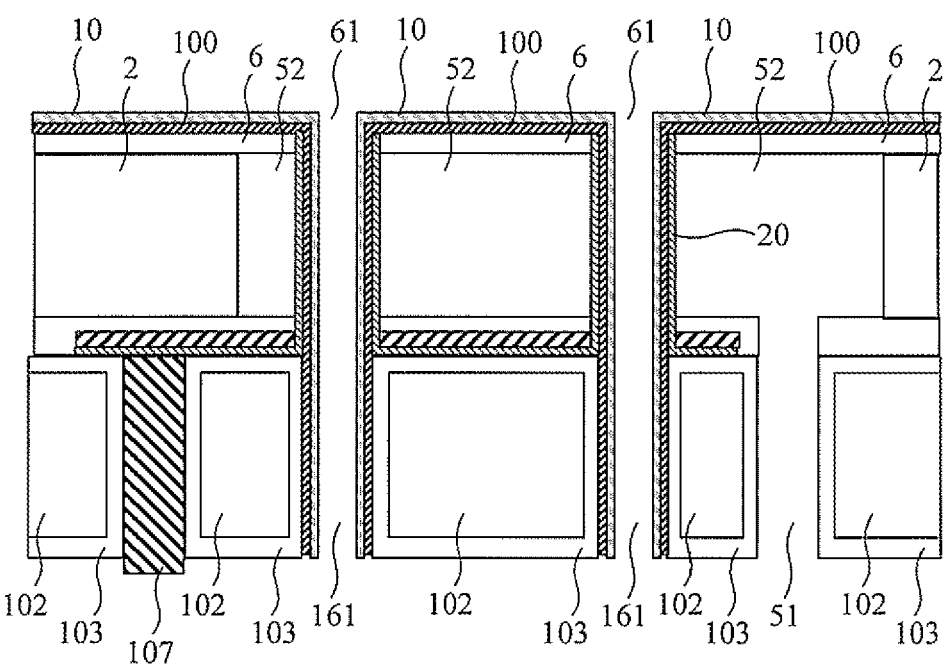
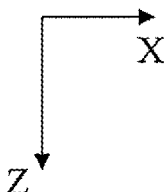

[FIG. 38]
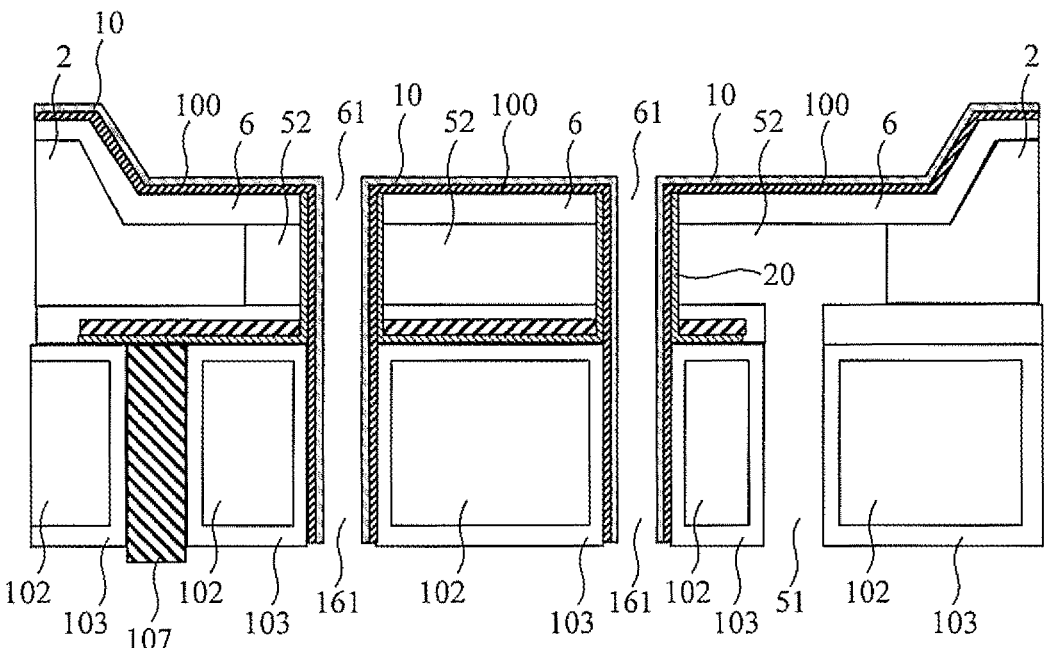
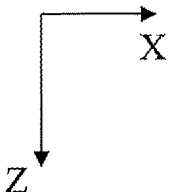

[FIG. 39]
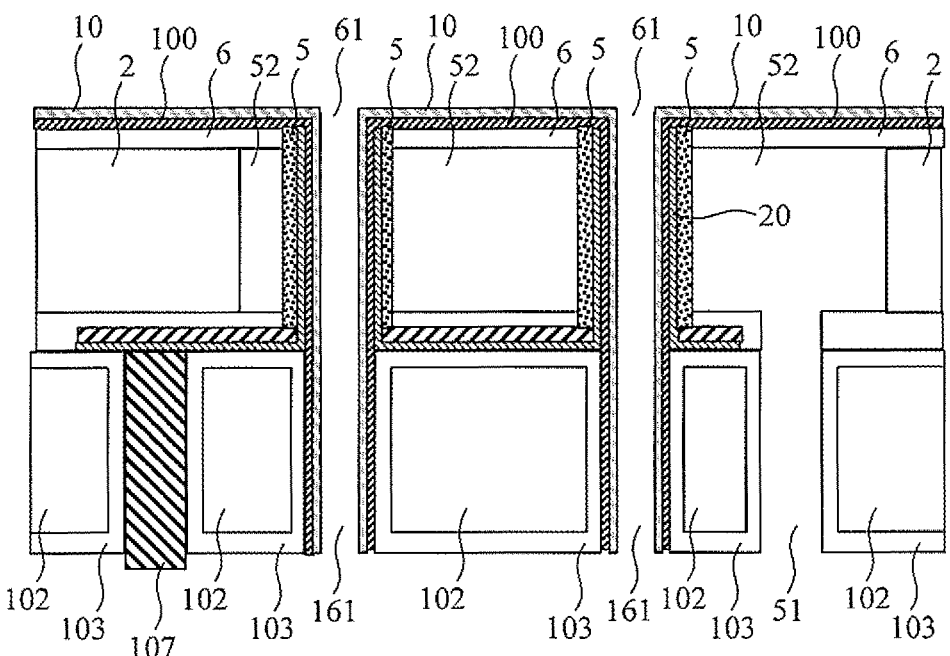
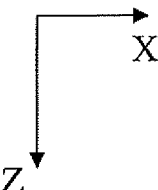

[FIG. 40]
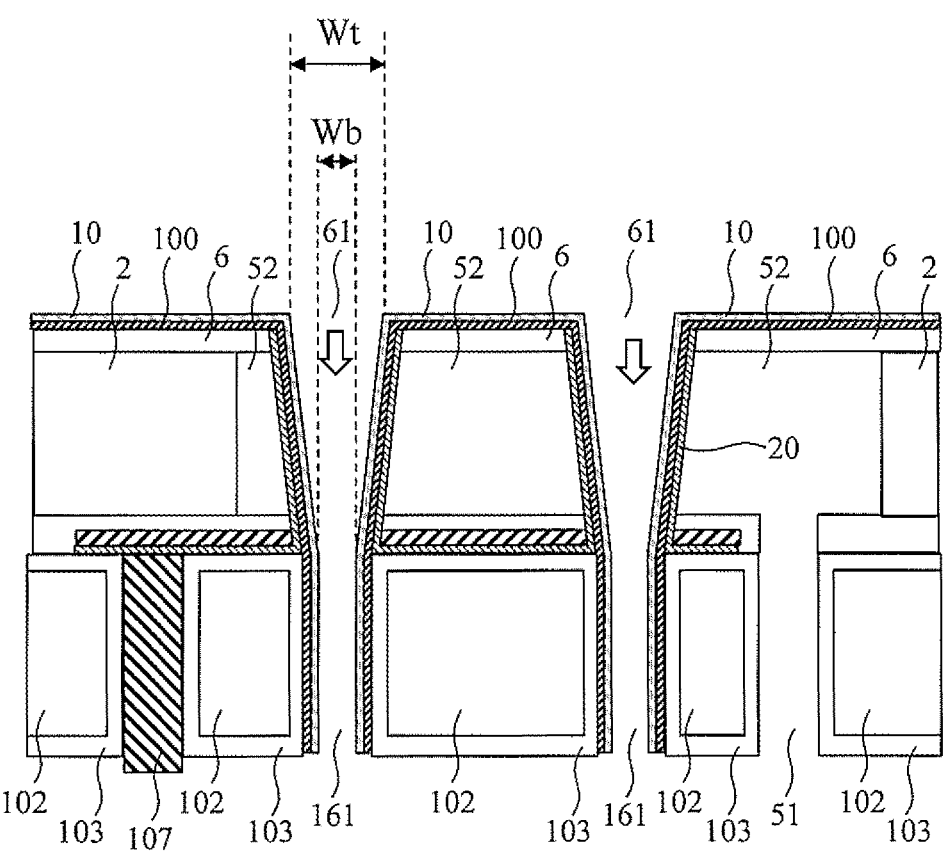
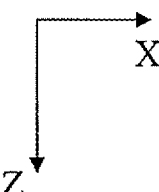

[FIG. 41]
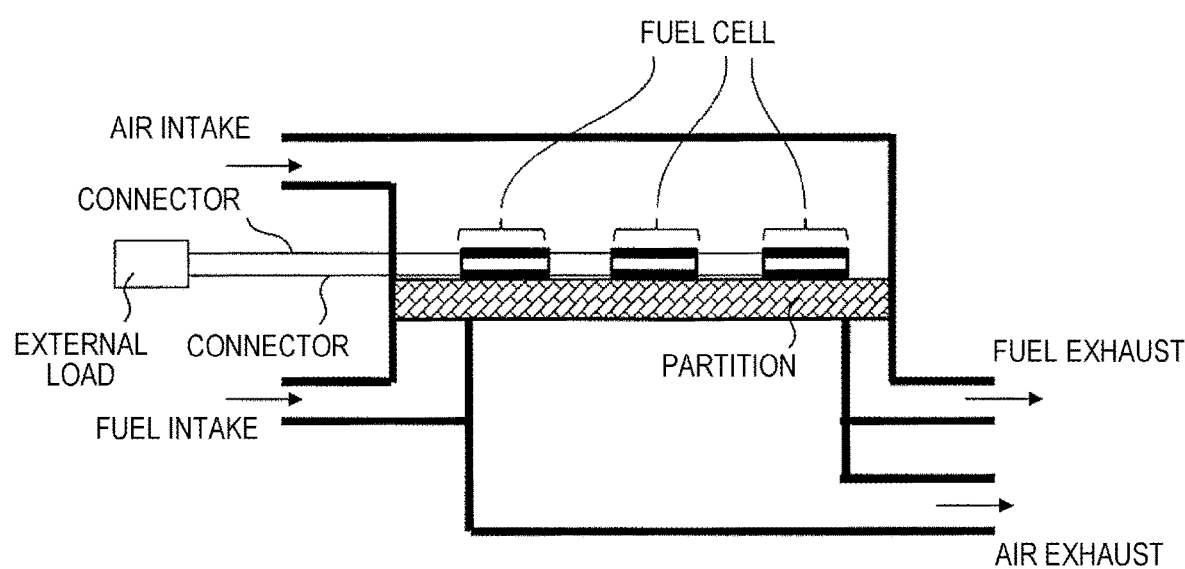
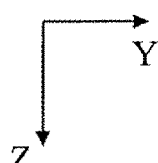

[FIG. 42]
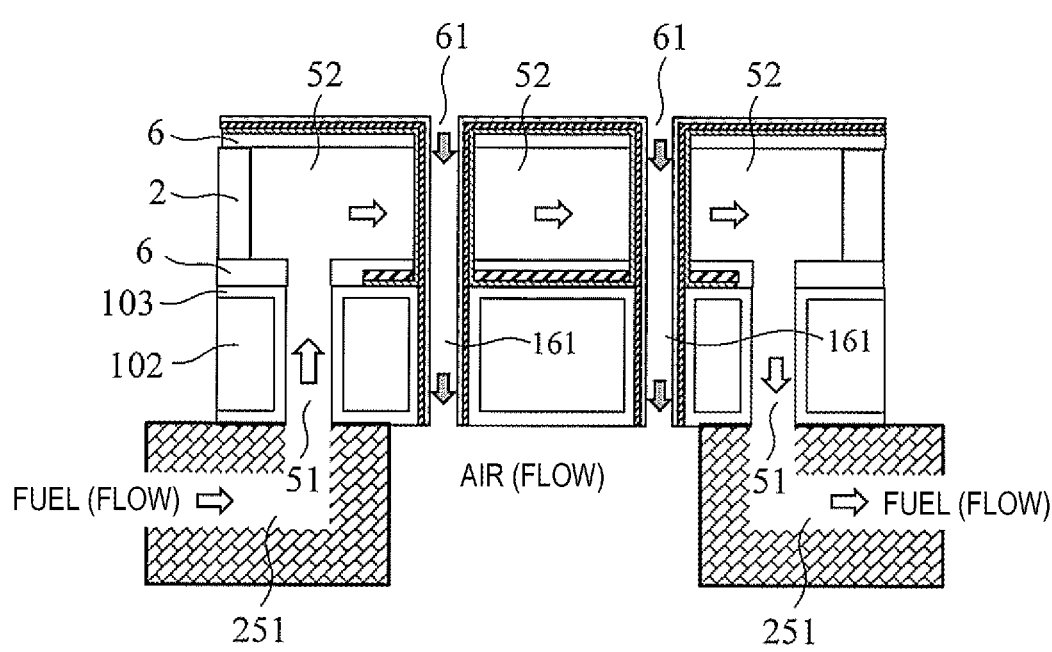
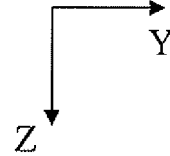

FUEL CELL AND METHOD FOR PRODUCING SAME

TECHNICAL FIELD

The present invention relates to a fuel cell and a method for manufacturing the same, and relates to, for example, a fuel cell in which a solid electrolyte layer is formed by a film forming process and a method for manufacturing the same.

BACKGROUND ART

Non-PTL 1 discloses a cell technique for forming an anode layer, a solid electrolyte layer, and a cathode layer of a fuel cell film by a thin film forming process in a fuel cell.

In order to improve an output power per area of a solid oxide fuel cell, it is necessary to reduce an internal resistance. As the internal resistance, an ohmic resistance of the solid electrolyte layer can be reduced by reducing a thickness of the solid electrolyte layer, but a polarization resistance of the cathode layer and the anode layer cannot be reduced. Therefore, there is a limit to the improvement of the output power by reducing the internal resistance, and it is necessary to increase the output power by other measures.

Non-PTL 2 discloses a technique in which an anode layer, a solid electrolyte layer, and a cathode layer of a fuel cell film having a three-dimensional structure are formed on a substrate by a thin film forming process to increase a surface area, thereby improving an output power per projected area on the substrate.

PTL 1 discloses a stack including a continuous solid phase matrix and tubular fuel cells embedded in the matrix.

PTL 2 discloses a configuration in which a porous substrate having a plurality of through holes is a fuel cell block including a cylindrical fuel cell element formed by sandwiching a solid electrolyte layer between an air electrode layer and a fuel electrode layer in the through holes.

CITATION LIST

Patent Literature

PTL 1: JP-T-2005-518075
PTL 2: JP-A-2005-174846

Non Patent Literature

Non-PTL 1: Journal of Power Sources 194 (2009) pp. 119-129
Non-PTL 2: Nano Letter 13 (2013) pp. 4551-4555

SUMMARY OF INVENTION

Technical Problem

In the related art, there is a problem that it is difficult to increase the output power per projected area on the substrate and form the fuel cell film in a wide region of the substrate.

As described in Non-PTL 2, when the fuel cell film having the three-dimensional structure is prepared on the substrate by the thin film forming process, mechanical strength of the thin film becomes weak. Therefore, it is difficult to form the fuel cell film having the three-dimensional structure in the wide region.

In the methods in PTLs 1 and 2, when a projection plane perpendicular to the hole is considered, the surface area of the fuel cell per projected area increases. In addition, since the fuel cell is supported by the porous substrate, strength can be secured. However, since the fuel cells formed in the individual holes are formed separately, the number of steps for manufacturing the fuel cell is proportional to the number of holes. Therefore, a cost per output power is relatively high.

The invention has been made in view of the above problems, and an object of the invention is to provide a fuel cell capable of increasing the output power per projected area on the substrate and forming the fuel cell film in the wide region of the substrate, and a method for manufacturing the same.

Solution to Problem

An example of a fuel cell according to the invention includes: a first substrate; a first support material layer formed on one surface or both surfaces of the first substrate; a plurality of holes or columns formed in the first support material layer in a manner of extending in a direction perpendicular to a main surface of the first substrate; and a stacked body formed by a film forming process on a surface of the plurality of holes or columns that is not parallel to the main surface, the stacked body including an upper electrode layer, a solid electrolyte layer, and a lower electrode layer. The upper electrode layer is also formed on a surface parallel to the main surface in a manner of being continuous to the upper electrode layer formed in the plurality of holes or columns, or the lower electrode layer is also formed on a surface parallel to the main surface in a manner of being continuous to the lower electrode layer formed in the plurality of holes or columns, and the stacked body is supported by the first support material layer in at least upper end portions and lower end portions of the plurality of holes or columns.

An example of a method for manufacturing a fuel cell according to the invention includes: a step of forming a metal-oxide layer on a surface of a substrate; a step of forming an uneven structure in the metal-oxide layer; a step of forming a lower electrode layer, a solid electrolyte layer, and an upper electrode layer in this order on a surface of the uneven structure; a step of removing a part of the substrate that is in contact with the metal-oxide layer; and a step of making the metal-oxide layer porous by reduction annealing.

An example of a method for manufacturing a fuel cell according to the invention includes: a step of forming a first support material layer on both surfaces of a first substrate; a step of forming a plurality of first through holes penetrating the first substrate and the first support material layer; a step of forming a stacked body on an inner peripheral surface of the plurality of first through holes and at least one side surface of the first support material layer, the stacked body including a lower electrode layer, a solid electrolyte layer, and an upper electrode layer; and a step of forming a hollow by removing a part of the first substrate that is in contact with the stacked body formed in the plurality of first through holes.

Advantageous Effects of Invention

According to the fuel cell in the invention, an output power per projected area on a substrate can be increased, and a fuel cell film can be formed in a wide region of the substrate.

Other problems, configurations, and effects will be clarified based on description of embodiments as follows.

BRIEF DESCRIPTION OF DRAWINGS

FIG. 1 is a diagram showing a configuration example of a fuel cell in the related art.

FIG. 2 is a schematic diagram showing a configuration example of a fuel cell module according to a first embodiment of the invention.

FIG. 3 is a view of a partition as viewed from a fuel cell side.

FIG. 4 is a view of the partition as viewed from a back side (that is, a side opposite to the fuel cell).

FIG. 5 is a schematic diagram showing a configuration example of a fuel cell 1 according to the first embodiment.

FIG. 6 is an enlarged perspective view of a portion of the fuel cell 1 according to the first embodiment.

FIG. 7 is a diagram illustrating an example of a method for manufacturing the fuel cell 1 according to the first embodiment.

FIG. 8 is a diagram illustrating the example of the method for manufacturing the fuel cell 1 according to the first embodiment.

FIG. 9 is a diagram illustrating the example of the method for manufacturing the fuel cell 1 according to the first embodiment.

FIG. 10 is a diagram illustrating the example of the method for manufacturing the fuel cell 1 according to the first embodiment.

FIG. 11 is a diagram illustrating the example of the method for manufacturing the fuel cell 1 according to the first embodiment.

FIG. 12 is a diagram illustrating the example of the method for manufacturing the fuel cell 1 according to the first embodiment.

FIG. 13 is a diagram illustrating the example of the method for manufacturing the fuel cell 1 according to the first embodiment.

FIG. 14 is a diagram illustrating the example of the method for manufacturing the fuel cell 1 according to the first embodiment.

FIG. 15 is a diagram illustrating the example of the method for manufacturing the fuel cell 1 according to the first embodiment.

FIG. 16 is a diagram illustrating the example of the method for manufacturing the fuel cell 1 according to the first embodiment.

FIG. 17 is a diagram showing a configuration example according to a first modification of the first embodiment.

FIG. 18 is a diagram showing a configuration example according to a second modification of the first embodiment.

FIG. 19 is a diagram showing a time point of a manufacturing process according to a third modification of the first embodiment.

FIG. 20 is a diagram showing a configuration example according to the third modification of the first embodiment.

FIG. 21 is a diagram showing a configuration example according to a fourth modification of the first embodiment.

FIG. 22 is a graph illustrating an effect according to the first embodiment.

FIG. 23 is a diagram illustrating an example of a method for manufacturing the fuel cell 1 according to a second embodiment.

FIG. 24 is a diagram illustrating the example of the method for manufacturing the fuel cell 1 according to the second embodiment.

FIG. 25 is a diagram illustrating the example of the method for manufacturing the fuel cell 1 according to the second embodiment.

FIG. 26 is a diagram illustrating the example of the method for manufacturing the fuel cell 1 according to the second embodiment.

FIG. 27 is a diagram illustrating the example of the method for manufacturing the fuel cell 1 according to the second embodiment.

FIG. 28 is a diagram illustrating the example of the method for manufacturing the fuel cell 1 according to the second embodiment.

FIG. 29 is a diagram illustrating the example of the method for manufacturing the fuel cell 1 according to the second embodiment.

FIG. 30 is a diagram illustrating the example of the method for manufacturing the fuel cell 1 according to the second embodiment.

FIG. 31 is a diagram illustrating the example of the method for manufacturing the fuel cell 1 according to the second embodiment.

FIG. 32 is a diagram illustrating the example of the method for manufacturing the fuel cell 1 according to the second embodiment.

FIG. 33 is a diagram illustrating the example of the method for manufacturing the fuel cell 1 according to the second embodiment.

FIG. 34 is a diagram illustrating the example of the method for manufacturing the fuel cell 1 according to the second embodiment.

FIG. 35 is a diagram illustrating the example of the method for manufacturing the fuel cell 1 according to the second embodiment.

FIG. 36 is a diagram illustrating the example of the method for manufacturing the fuel cell 1 according to the second embodiment.

FIG. 37 is a diagram showing a configuration example according to a first modification of the second embodiment.

FIG. 38 is a diagram showing a configuration example according to a second modification of the second embodiment.

FIG. 39 is a diagram showing a configuration example according to a third modification of the second embodiment.

FIG. 40 is a diagram showing a configuration example according to a fourth modification of the second embodiment.

FIG. 41 is a schematic diagram showing a configuration example of a fuel cell module according to the second embodiment.

FIG. 42 is a schematic diagram showing an example of a method for connecting the partition and the fuel cell 1.

DESCRIPTION OF EMBODIMENTS

Hereinafter, embodiments of the invention will be described with reference to the drawings. The embodiments are examples used for describing the invention, and omission and simplification are appropriately made for clarified description. The invention can be implemented in other various forms. Unless otherwise specified, each component may be singular or plural.

In order to facilitate understanding of the invention, a position, a size, a shape, a range, or the like of each component shown in the drawings may not represent an actual position, size, shape, range, or the like. Therefore, the invention is not necessarily limited to the position, the size, the shape, the range, or the like shown in the drawings.

When there are a plurality of components having the same or similar functions, different subscripts may be added to the same reference numeral. When it is not necessary to distinguish the plurality of components from one another, the subscripts may be omitted in the description.

In the following embodiments, an X direction, a Y direction, and a Z direction are used as directions for description. The X direction and the Y direction are directions that are orthogonal to each other and constitute a horizontal plane. The Z direction is a direction perpendicular to the horizontal plane, and is an upper-lower direction. In particular, a positive direction in the Z direction is defined as an upper direction, and a negative direction in the Z direction is defined as a lower direction. Note that these directions are defined for convenience of description, and are not related to the directions when fuel cells are actually provided or used.

In the drawings used in the embodiments, hatching may be omitted even in a cross-sectional view in order to make the drawings easy to see. In addition, the hatching may be added even in a plan view in order to make the drawings easy to see.

In the cross-sectional view and the plan view, sizes of parts do not correspond to those of an actual device, and an identified part may be displayed in a relatively large size in order to make the drawings easy to understand. Even in a case in which the sizes of the parts in the cross-sectional view and the plan view correspond to those of the actual device, an identified part may be displayed in a relatively large size in order to make the drawings easy to understand.

Configuration of Fuel Cell in Related Art

FIG. 1 shows a configuration example of a fuel cell in the related art. The fuel cell is of a thin-film process type of fuel cell. With reference to FIG. 1, the related art according to an increase in output power per projected area on a substrate and a decrease in operating temperature will be described.

The fuel cell includes a thinned solid electrolyte layer. In order to improve power generation efficiency of the fuel cell and implement a low-temperature operation, it is necessary to reduce a thickness of a solid electrolyte layer that constitutes a membrane electrode assembly. For this purpose, a thin-film process type of fuel cell in which the solid electrolyte layer is formed in a film forming process is most suitable. When thicknesses of an anode electrode layer, a solid electrolyte layer, and a cathode electrode layer are all reduced, mechanical strength of the membrane electrode assembly is weakened, but the mechanical strength can be compensated by substrate supporting as shown in FIG. 1.

For the substrate, silicon, ceramic, glass, metal, or the like can be used. In FIG. 1, an insulating film is formed on the substrate, the solid electrolyte layer is formed on the insulating film, and an upper electrode layer is formed on the solid electrolyte layer. Further, a lower electrode layer is formed from a lower side of the substrate via an opening formed in the substrate. The upper electrode layer and the lower electrode layer can be formed of a porous material.

First Embodiment: Configuration of Fuel Cell

FIG. 2 is a schematic diagram showing a configuration example of a fuel cell module according to a first embodiment of the invention. The fuel cell module includes a thin-film process type of solid oxide fuel cell (SOFC) as the fuel cell. A gas flow path in the module is separated into a flow path for fuel gas (for example, gas containing hydrogen) and a flow path for oxidant gas (for example, gas containing oxygen, and air as a specific example). The flow path for fuel gas includes a fuel intake, a fuel chamber, and a fuel exhaust. The flow path for oxidant gas includes an air intake, an air chamber, and an air exhaust. The fuel gas and the oxidant gas are shielded by a partition in FIG. 2 so as not to be mixed in the module. A wiring is led out from an anode electrode and a cathode electrode of the fuel cell by a connector, and the wiring is connected to an external load.

FIG. 3 is a view of the partition as viewed from a fuel cell side. The fuel cell is mounted on the partition. The number of fuel cells may be one, but in general, a plurality of fuel cells are arranged.

FIG. 4 is a view of the partition as viewed from a back side (that is, a side opposite to the fuel cell). A hole is formed in the partition for each fuel cell, so that the fuel gas is supplied from the fuel chamber to the fuel cell.

FIG. 5 is a schematic diagram showing a configuration example of a fuel cell 1 according to the first embodiment. The fuel cell 1 corresponds to the fuel cell shown in FIGS. 2 to 4. The fuel cell 1 includes a silicon substrate 2 (first substrate). An insulating film 3 is formed on a part of an upper surface of the silicon substrate 2. The insulating film 3 can be formed of, for example, a silicon oxide film or a silicon nitride film. An opening 50 from which the silicon substrate 2 is removed is formed in a center portion of the silicon substrate 2.

A porous support material layer 5 (first support material layer) is formed on the upper surface of the silicon substrate 2. A periphery of the porous support material layer 5 in the X and Y directions is surrounded by the insulating film 3. The porous support material layer 5 can be formed of, for example, metal nickel. A nickel oxide layer 4 (first support material layer) may be formed on an outer edge of the porous support material layer 5 in the X and Y directions by a manufacturing process described later.

A plurality of holes 60 are formed in an upper surface of the porous support material layer 5. The hole 60 is a bottomed hole, and extends in the upper-lower direction (that is, a direction perpendicular to a main surface of the silicon substrate 2). A lower electrode layer 20 is formed on the porous support material layer 5. The lower electrode layer 20 covers a bottom portion of the hole 60, a side wall portion of the hole 60, and one side surface of the porous support material layer 5.

The lower electrode layer 20 may be formed of, for example, platinum, or may be formed of a cermet material made of platinum and a metal oxide.

A solid electrolyte layer 100 is formed on an upper side of the lower electrode layer 20. The solid electrolyte layer 100 is formed of, for example, a zirconia thin film doped with yttria. A doping amount of yttria can be, for example, 3% or 8%. The solid electrolyte layer 100 completely covers the opening 50, and similarly to the lower electrode layer 20, covers the bottom portion of the hole 60, the side wall portion of the hole 60, and the one side surface of the porous support material layer 5. A film thickness of the solid electrolyte layer 100 can be, for example, 1000 nm or less. When yttria stabilized zirconia (YSZ) is used, the film thickness of the solid electrolyte layer 100 can be reduced to 100 nm or less since an electron current and a hole current, which are internal leakage currents of the fuel cell 1, are extremely small even at high temperatures.

In order to connect the wiring to the lower electrode layer 20, as shown in FIG. 5, the solid electrolyte layer 100 is not present on a part of an upper surface of the lower electrode layer 20, and the part of the upper surface of the lower electrode layer 20 is exposed. When the wiring is connected to the lower electrode layer 20, a wiring connection portion is formed on the insulating film 3 in order to prevent damage to other portions (the porous support material layer 5 and the like) of the fuel cell. In the lower electrode layer connected to the wiring, the lower electrode layer 20 formed on side walls and the bottom portions of the plurality of holes 60 are electrically connected to one another.

An upper electrode layer 10 is formed on an upper side of the solid electrolyte layer 100. The upper electrode layer 10 may be formed of, for example, platinum, or may be formed of a cermet material made of platinum and a metal oxide. Similarly to the lower electrode layer 20, the upper electrode layer 10 also covers the bottom portion of the hole 60, the side wall portion of the hole 60, and the one side surface of the porous support material layer 5.

In order to connect the wiring to the upper electrode layer 10, a region in which the lower electrode layer 20 is not present is formed under the upper electrode layer 10 as in a right side portion on the drawing of a cross-sectional view of FIG. 5. This is to prevent an electrical short circuit between the upper electrode layer 10 and the lower electrode layer 20 when the solid electrolyte layer 100 is damaged due to damage at the time of connecting the wiring. In addition, in order to prevent the damage to other portions (the porous support material layer 5 and the like) of the fuel cell, it is preferable that the wiring connection portion is formed on the insulating film 3. In the upper electrode layer 10 connected to the wiring, the upper electrode layer 10 formed on the side walls and the bottom portions of the plurality of holes 60 are electrically connected to one another.

As described above, the thin-film process type of the fuel cell 1 includes a membrane electrode assembly as a stacked body including the lower electrode layer 20, the solid electrolyte layer 100, and the upper electrode layer 10. The membrane electrode assembly is formed by the film forming process on a surface of the plurality of holes 60 that is not parallel to the main surface of the silicon substrate 2 (that is, the side wall portions of the holes 60). The membrane electrode assembly is also formed at the bottom portions of the plurality of holes 60.

The membrane electrode assembly covers the upper surface of the porous support material layer 5 in which the plurality of holes 60 are formed (that is, the bottom portions of the holes 60, the side wall portions of the holes 60, and a portion in which the holes 60 are not formed). That is, the upper electrode layer 10 is also formed on a surface parallel to the main surface of the silicon substrate 2 in a manner of being continuous (or connected) to the upper electrode layer 10 formed in the plurality of holes 60. In addition, the lower electrode layer 20 is also formed on the surface parallel to the main surface of the silicon substrate 2 in a manner of being continuous (or connected) to the lower electrode layer 20 formed in the plurality of holes 60. The same applies to the solid electrolyte layer 100.

In this example, both the upper electrode layer 10 and the lower electrode layer 20 are formed on the surface parallel to the main surface of the silicon substrate 2. Alternatively, one of them may be formed on the main surface of the silicon substrate 2 alone.

In this manner, since the membrane electrode assembly is formed on the side wall portions of the holes 60, an output power per projected area on the silicon substrate 2 is increased. Further, since the membrane electrode assembly is also formed on the surface parallel to the main surface of the silicon substrate 2, the membrane electrode assembly is formed in a wide region of the silicon substrate 2.

The membrane electrode assembly is supported by the porous support material layer 5 at the entire hole 60 including an upper end portion and a lower end portion.

For a size of the hole 60, a diameter thereof can be, for example, 500 nanometers to 10 micrometers. It is necessary to design the size of the hole 60 and a thickness of the membrane electrode assembly, so that the hole 60 is not completely filled with the membrane electrode assembly formed in the hole 60.

FIG. 6 is an enlarged perspective view of a part of the fuel cell 1. The fuel gas is supplied to a lower electrode layer 20 side of the fuel cell 1, and the oxidant gas is supplied to an upper electrode layer 10 side. In this case, the lower electrode layer 20 serves as an anode layer, and the upper electrode layer 10 serves as a cathode layer. The supplied fuel gas diffuses inside the porous support material layer 5 and reaches the lower electrode layer 20. The supplied oxidant gas diffuses to a surface of the upper electrode layer 10 inside the hole 60 so as to be supplied. The oxidant gas and the fuel gas react with each other by ion conduction via the solid electrolyte layer 100, so that the fuel cell 1 operates in the same manner as a known fuel cell. A space between a lower electrode layer 20 side and the upper electrode layer 10 side is sealed, so that the oxidant gas and the fuel gas are not mixed with each other in a gas state.

As for the supply of the fuel gas and the oxidant gas, contrary to FIG. 6, the oxidant gas may be supplied to the lower electrode layer 20 side, and the fuel gas may be supplied to the upper electrode layer 10 side. The lower electrode layer serves as the cathode layer, and the upper electrode layer serves as the anode layer. In this case, the supplied oxidant gas diffuses inside the porous support material layer and reaches the lower electrode layer 20, and the supplied fuel gas diffuses to the surface of the upper electrode layer inside the hole 60 so as to be supplied. Even in this case, the fuel cell 1 operates in the same manner as a known fuel cell.

First Embodiment: Method for Manufacturing Fuel Cell

FIGS. 7 to 16 are diagrams illustrating an example of a method for manufacturing the fuel cell 1 according to the first embodiment. First, the insulating film 3 is formed on the silicon substrate 2 (FIG. 7). Next, the insulating film 3 is removed while remaining an outer edge portion of the insulating film 3 in the X and Y directions (FIG. 8). Therefore, the flat nickel oxide layer 4 (metal-oxide layer) is formed on the exposed surface of the silicon substrate 2, a side wall of the insulating film 3, and an upper surface of the insulating film 3 (FIG. 9). In this manner, the nickel oxide layer 4 is formed on the surface of the silicon substrate 2. Next, a part of the nickel oxide layer 4 is removed to expose the upper surface of the insulating film 3 (FIG. 10).

Next, the plurality of holes 60 extending in a direction perpendicular to the surface of the silicon substrate 2 are formed in an upper surface of the nickel oxide layer 4 as uneven structures (FIG. 11). At this time, the bottom portions of the holes 60 do not penetrate the nickel oxide layer 4. A cross-sectional shape of the hole 60 can be, for example, a circle, but can also be an oval shape, or can be a polygon such as a square, a rectangle, a pentagon, or a hexagon. The cross-sectional shape of the hole 60 may be constant in the upper-lower direction or may change along the upper-lower direction.

A method for forming the uneven structure (the hole 60 in this example) can be appropriately determined by those skilled in the art, and the uneven structure can be formed by, for example, lithography and dry etching. It is preferable that the uneven structures are formed periodically in the X direction and/or the Y direction, but the invention is not limited thereto. In addition, it is preferable that all of the uneven structures are formed in the same shape, but the invention is not limited thereto.

Next, the lower electrode layer 20 is formed on an upper side of the nickel oxide layer 4 and the insulating film 3 (FIG. 12). At this time, the lower electrode layer 20 covers the bottom portions and the side wall portions of the plurality of holes 60 and a region of the upper surface of the nickel oxide layer 4 in which the holes 60 are not formed. Although the lower electrode layer 20 is also formed on the upper side of the insulating film 3, a region in which the lower electrode layer 20 is not formed remains in a part of the upper side of the insulating film 3. This is because a region for connecting the upper electrode layer 10 and the wiring in a later step is prepared.

For example, a chemical vapor deposition (CVD) method or an atomic layer deposition (ALD) method can be used to form the lower electrode layer 20. As a method for providing a region in which the lower electrode layer 20 is not formed, for example, after the lower electrode layer 20 is formed, a part of the lower electrode layer 20 can be removed using the lithography and the dry etching. Alternatively, at the time of forming the lower electrode layer 20, a metal mask or a resist mask is used to cover a part of the region, so that the lower electrode layer can be prevented from being formed in the part of the region.

Next, the solid electrolyte layer 100 is formed (FIG. 13). At this time, similarly to the formation of the lower electrode layer 20, the solid electrolyte layer 100 is formed on the upper side of the lower electrode layer 20 in a manner of covering the bottom portions and the side wall portions of the plurality of holes 60 and the region of the upper surface of the nickel oxide layer 4 in which the holes 60 are not formed. Although the solid electrolyte layer 100 is also formed on the insulating film 3, a region in which the solid electrolyte layer 100 is not formed remains in a part of a region in which the lower electrode layer 20 is formed on the insulating film 3. This is because a region for connecting the lower electrode layer 20 and the wiring in a later step is prepared.

The solid electrolyte layer 100 can be formed of, for example, the zirconia thin film doped with yttria. A doping amount of yttria can be, for example, 3% or 8%. For example, the chemical vapor deposition (CVD) method or the atomic layer deposition (ALD) method can be used to form the solid electrolyte layer 100. As a method for providing a region in which the solid electrolyte layer 100 is not formed, for example, after the solid electrolyte layer 100 is formed, a part of the solid electrolyte layer 100 can be removed using the lithography and the dry etching. Alternatively, at the time of forming the solid electrolyte layer 100, the metal mask or the resist mask is used to cover a part of the region, so that the solid electrolyte layer 100 can be prevented from being formed in the part of the region.

Next, the upper electrode layer 10 is formed (FIG. 14). At this time, similarly to the formation of the lower electrode layer 20 and the formation of the solid electrolyte layer 100, the upper electrode layer 10 is formed on the upper side of the solid electrolyte layer 100 in a manner of covering the bottom portions and the side wall portions of the plurality of holes 60 and the region of the upper surface of the nickel oxide layer 4 in which the holes 60 are not formed. Although the upper electrode layer 10 is also formed on the insulating film 3, a region in which the upper electrode layer 10 is not formed remains in the part of the region in which the lower electrode layer 20 is formed on the insulating film 3. This is to prevent the upper electrode layer 10 and the lower electrode layer 20 from being electrically directly connected to each other and causing a short circuit failure, and to prepare the region for connecting the lower electrode layer 20 and the wiring in a later step.

The upper electrode layer 10 may be formed of, for example, porous platinum, or may be formed of a cermet material made of platinum and a metal oxide. For example, the chemical vapor deposition (CVD) method or the atomic layer deposition (ALD) method can be used to form the upper electrode layer 10. As a method for providing a region in which the upper electrode layer is not formed, for example, after the upper electrode layer is formed, a part of the upper electrode layer 10 can be removed using the lithography and the dry etching. Alternatively, at the time of forming the upper electrode layer 10, the metal mask or the resist mask is used to cover a part of the region, so that the upper electrode layer 10 can be prevented from being formed in the part of the region.

As described above, the lower electrode layer 20, the solid electrolyte layer 100, and the upper electrode layer 10 are formed in this order in a region including the surface of the holes 60.

Next, a part of the silicon substrate 2 in contact with the nickel oxide layer 4 is partially removed from a lower side to form the opening 50 (FIG. 15). After the opening 50 is formed, the nickel oxide layer 4 is made porous by reduction annealing. For example, a lower side surface of the silicon substrate 2 is exposed to a hydrogen atmosphere, and heat treatment is performed at about 500° C. Accordingly, a part of the nickel oxide layer 4 exposed at the opening 50 is reduced and changed into the porous support material layer 5 (for example, a porous metal nickel layer) (FIG. 16). At this time, a part of a region of the nickel oxide layer 4 covered by the silicon substrate 2 may remain as the nickel oxide layer 4 without being reduced. As a result, the structure in FIG. 5 can be prepared.

By forming the porous support material layer 5 as described above, gas can be diffused via this porous support material layer 5.

First Embodiment: First Modification

FIG. 17 shows a configuration example according to a first modification of the first embodiment. In the first embodiment, the wiring connected to the lower electrode layer 20 is formed on the upper surface of the silicon substrate 2, but in the first modification, the wiring is not provided on the upper surface of the silicon substrate 2.

In the first modification, a conductive silicon substrate doped with impurities is used as the silicon substrate 2. Alternatively, instead of the silicon substrate 2, a conductive metal substrate is used as the first substrate. Accordingly, the lower electrode layer 20 is electrically connected to one side surface (a lower surface in a cross-sectional view of FIG. 17) of the substrate 2 via the porous support material layer 5 and the substrate 2. In the present modification, the porous support material layer 5 is limited to a metal layer, and is, for example, a metal nickel layer.

Since the lower electrode layer 20 and the wiring can be connected to each other on the lower surface of the substrate, it is not necessary to form a portion for connecting the lower electrode layer 20 and the wiring on an upper surface side of the substrate. As a result, an entire outer edge portion of the upper surface of the substrate in the X and Y directions can be served as the portion for connecting the upper electrode layer 10 and the wiring.

An outer edge 70 of the lower electrode layer 20 remains on the nickel oxide layer 4, and the lower electrode layer 20 is not formed on the upper surface of the insulating film 3. Therefore, a region in which only the solid electrolyte layer 100 and the upper electrode layer 10 are formed can be formed over an entire outer edge portion of the fuel cell 1 to be served as the portion for connecting the upper electrode layer and the wiring.

First Embodiment: Second Modification

FIG. 18 shows a configuration example according to a second modification of the first embodiment. On the porous support material layer 5, a surface (a lower surface in a cross-sectional view of FIG. 18) opposite to the surface on which the plurality of holes 60 are formed is supported by a mesh-shaped support material layer 6a (second support material layer). The support material layer 6a can be formed of a silicon nitride film, dense metal nickel, a silicon oxide film, or the like.

Since the porous support material layer 5 is supported by the support material layer 6a, sufficient mechanical strength can be secured in the structures of the lower electrode layer 20, the solid electrolyte layer 100, the upper electrode layer 10, and the porous support material layer 5 even when an area of the opening 50 is increased.

First Embodiment: Third Modification

A third modification of the first embodiment will be described with reference to FIGS. 19 and 20. FIG. 19 shows a time point of a manufacturing process, and FIG. 20 shows a configuration after the manufacturing process is completed.

In the first embodiment and each of the above-described modifications, the plurality of holes 60 are formed as the uneven structures in the porous support material layer 5, but in the third modification, as shown in FIGS. 19 and 20, a plurality of columns 40 are formed as the uneven structures in the porous support material layer 5. The column 40 is a protrusion, and may form, for example, a column-shaped pattern.

In particular, in the first embodiment, as shown in FIG. 11, the plurality of holes 60 are formed in the surface of the nickel oxide layer 4, but in the third modification, as shown in FIG. 19, the plurality of columns 40 are formed as the uneven structures on the surface of the nickel oxide layer 4.

The column 40 extends in the upper-lower direction (that is, the direction perpendicular to the main surface of the silicon substrate 2). On the nickel oxide layer 4, the membrane electrode assembly is formed on upper surfaces and side surfaces of the plurality of columns 40 and a portion (bottom portion) of the nickel oxide layer 4 where the columns 40 are not formed in the same manner as in the first embodiment. This membrane electrode assembly is formed by the film forming process on a surface of the plurality of columns 40 that is not parallel to the main surface of the silicon substrate 2. The membrane electrode assembly is also formed at top portions (top surfaces) of the plurality of columns 40.

Further, after the opening 50 (not shown) is formed, the nickel oxide layer 4 is made porous from the lower side by reduction annealing to form the porous support material layer (FIG. 20). A cross-sectional shape of the column 40 in an XY plane can be, for example, a circle, but can also be an ellipse, a square, a rectangle, a pentagon, a hexagon, or the like. The cross-sectional shape of the column 40 may be constant in the upper-lower direction or may change along the upper-lower direction.

The membrane electrode assembly formed on an outer peripheral portion of the column 40 formed on the silicon substrate 2 has the same structure as that of the membrane electrode assembly formed on the side wall portion of the hole 60 in the first embodiment.

The membrane electrode assembly covers the upper surface of the porous support material layer 5 in which the plurality of columns 40 are formed (that is, the top portions of the columns 40, the outer peripheral portions of the columns 40, and the portion in which the columns 40 are not formed). That is, the upper electrode layer 10 is also formed on the surface parallel to the main surface of the silicon substrate 2 in a manner of being continuous (or connected) to the upper electrode layer 10 formed on the plurality of columns 40. In addition, the lower electrode layer 20 is also formed on the surface parallel to the main surface of the silicon substrate 2 in a manner of being continuous (or connected) to the lower electrode layer 20 formed on the plurality of columns 40.

In this example, both the upper electrode layer 10 and the lower electrode layer 20 are formed on the surface parallel to the main surface of the silicon substrate 2. Alternatively, one of them may be formed on the surface parallel to the main surface of the silicon substrate 2 alone.

The membrane electrode assembly is supported by the porous support material layer 5 at the entire plurality of columns 40 including upper end portions and lower end portions.

For a size of the column 40, a diameter thereof can be, for example, 100 nanometers to 10 micrometers. It is necessary to design the size of the column 40 and the thickness of the membrane electrode assembly, so that a space between the adjacent columns 40 is not completely filled with the membrane electrode assembly formed on outer peripheries of the columns 40.

As shown in FIG. 20, the fuel gas is supplied to the lower electrode layer 20 side, and the oxidant gas is supplied to the upper electrode layer 10 side. The lower electrode layer 20 serves as the anode layer, and the upper electrode layer 10 serves as the cathode layer. The supplied fuel gas diffuses inside the porous support material layer 5 and reaches the lower electrode layer 20. The supplied oxidant gas diffuses to the surface of the upper electrode layer 10 so as to be supplied. Accordingly, the fuel cell 1 operates in the same manner as in the case in FIG. 6.

As for the supply of the fuel gas and the oxidant gas, contrary to FIG. 20, the oxidant gas may be supplied to the lower electrode layer 20 side, and the fuel gas may be supplied to the upper electrode layer 10 side. The lower electrode layer serves as the cathode layer, and the upper electrode layer serves as the anode layer. In this case, the supplied oxidant gas diffuses inside the porous support material layer and reaches the lower electrode layer 20, and the supplied fuel gas diffuses to the surface of the upper electrode layer inside the hole 60 so as to be supplied. Even in this case, the fuel cell 1 operates in the same manner as a known fuel cell.

Either of the hole 60 according to the first embodiment and the column 40 according to the third modification is the example of the uneven structure that can be easily manufactured. In addition, depending on the configuration of the fuel cell 1, one of the hole 60 and the column 40 may be more easily manufactured. For example, as a characteristic of the nickel oxide layer 4 or a layer corresponding thereto, when it is easy to precisely form the hole, the configuration according to the first embodiment can be more efficiently manufactured. On the other hand, when it is easy to precisely form the column, the configuration according to the third modification can be more efficiently manufactured.

Alternatively, when the membrane electrode assembly is easily formed on the side walls and the bottom portions of the holes 60 at the time of forming the membrane electrode assembly, the configuration according to the first embodiment can be more efficiently manufactured. On the other hand, when the membrane electrode assembly is easily formed on side walls and the top portions of the columns 40, the configuration according to the third modification can be more efficiently manufactured.

First Embodiment: Fourth Modification

FIG. 21 shows a configuration example according to a fourth modification of the first embodiment. In the first embodiment and the first to third modifications, a lower surface of the porous support material layer 5 has a flat shape, but in the fourth modification, unevenness is formed along the side walls of the plurality of holes 60.

A thickness of a part of the porous support material layer in which the plurality of holes 60 are formed is constant. The configuration of the membrane electrode assembly is the same as that according to the first embodiment.

As shown in FIG. 21, the fuel gas is supplied to the lower electrode layer 20 side, and the oxidant gas is supplied to the upper electrode layer 10 side. The lower electrode layer 20 serves as the anode layer, and the upper electrode layer 10 serves as the cathode layer. The supplied fuel gas diffuses inside the porous support material layer 5 and reaches the lower electrode layer 20. As compared with the first embodiment (FIG. 5), the first modification (FIG. 17), the second modification (FIG. 18), and the third modification (FIG. 20), a structure becomes complicated, but since the thickness of the porous support material layer 5 is constant, a diffusion distance is also constant, which is advantageous for the supply of the fuel gas. The supplied oxidant gas diffuses to the surface of the upper electrode layer 10 so as to be supplied. Accordingly, the fuel cell 1 operates in the same manner as in the case in FIG. 6.

As for the supply of the fuel gas and the oxidant gas, contrary to FIG. 21, the oxidant gas may be supplied to the lower electrode layer 20 side, and the fuel gas may be supplied to the upper electrode layer 10 side. The lower electrode layer serves as the cathode layer, and the upper electrode layer serves as the anode layer. In this case, the supplied oxidant gas diffuses inside the porous support material layer and reaches the lower electrode layer 20, and the supplied fuel gas diffuses to the surface of the upper electrode layer inside the hole 60 so as to be supplied. Since the porous support material layer 5 is thin, the diffusion distance is short, which is advantageous for the supply of the oxidant gas. Even in this case, the fuel cell 1 operates in the same manner as a known fuel cell.

First Embodiment: Effects

FIG. 22 is a graph illustrating an effect according to the first embodiment. Relationships, each between an aspect ratio of the hole or the column and a cell area per projected area on the substrate, in a fuel cell according to the related art and the fuel cell 1 according to the first embodiment are shown. The aspect ratio of the hole is a value obtained by dividing a depth of the hole by the diameter, and the aspect ratio of the column is a value obtained by dividing a height of the column by the diameter.

According to the first embodiment, as the aspect ratio of the hole or the column increases, the cell area per projected area on the substrate can be increased. That is, according to the first embodiment, since the cell area contributing to power generation can be increased with a small substrate area, an output power per substrate area can be increased.

In the first embodiment, a large number of holes 60 can be formed in parallel, and it is not necessary to separately form the holes 60. Therefore, the fuel cell 1 can be manufactured at a cost lower than those in, for example, methods in PTL 1 and PTL 2, and a cost per output power can be reduced.

Second Embodiment

In the first embodiment, as shown in FIGS. 5, 17, 18, 20, and 21, the bottomed holes 60 or the columns 40 are formed, and the membrane electrode assembly is also formed at tip end portions in a depth direction (the bottom portions of the holes 60 or the top portions of the columns 40). In a second embodiment, a through hole is formed instead of the bottomed hole.

FIG. 23 shows a configuration example of a fuel cell according to the second embodiment. A support material layer 6 (first support material layer) is formed on one surface (the upper surface or the lower surface) or both surfaces (that is, the upper surface and the lower surface) of the silicon substrate 2. In addition, a plurality of through holes 61 (first through holes) penetrating the support material layer 6 and the silicon substrate 2 are formed. The through hole 61 extends in the upper-lower direction (that is, the direction perpendicular to the main surface of the silicon substrate 2).

For a size of the through hole 61, a diameter (diameter of the through hole formed in the support material layer 6) of the through hole 61 can be, for example, 10 micrometers. Side walls of the plurality of through holes 61 include the membrane electrode assembly. This membrane electrode assembly is formed by the film forming process on a surface of the plurality of through holes 61 that is not parallel to the main surface of the silicon substrate 2. The membrane electrode assembly is also formed on an upper surface of the support material layer 6 formed on the upper surface of the silicon substrate 2. Hollows 52 are formed on an outer peripheral side of the side walls of the plurality of through holes 61.

Although not shown, as in the right side portion on the drawing of the cross-sectional view of FIG. 5 in the first embodiment, the region in which the lower electrode layer 20 is not present may be formed under the upper electrode layer 10. In this manner, when the solid electrolyte layer 100 is damaged due to damage at the time of connecting the upper electrode layer 10 and the wiring, it is possible to prevent the electrical short circuit from occurring between the upper electrode layer 10 and the lower electrode layer 20.

The upper electrode layer 10 is also formed on the surface parallel to the main surface of the silicon substrate 2 in a manner of being continuous (or connected) to the upper electrode layer 10 formed in the plurality of through holes 61. In addition, the lower electrode layer 20 is also formed on the surface parallel to the main surface of the silicon substrate 2 in a manner of being continuous (or connected) to the lower electrode layer 20 formed in the plurality of through holes 61. The same applies to the solid electrolyte layer 100.

That is, the upper electrode layer 10 connected to the wiring on the upper surface of the silicon substrate 2 is continuous to and electrically connected to the upper electrode layer 10 formed on the side walls of the plurality of through holes 61. The lower electrode layer 20 is formed on a lower surface of the support material layer 6 formed on the lower surface of the silicon substrate 2, and the lower electrode layer 20 is continuous to the lower electrode layer 20 formed on the side walls of the plurality of through holes 61. The lower electrode layer 20 connected to the wiring on a lower surface side of the silicon substrate 2 is continuous to and electrically connected to the lower electrode layer 20 formed on the side walls of the plurality of through holes 61.

In this example, both the upper electrode layer 10 and the lower electrode layer 20 are formed on the surface parallel to the main surface of the silicon substrate 2. Alternatively, one of them may be formed on the surface parallel to the main surface of the silicon substrate 2 alone.

The membrane electrode assembly is supported by the support material layer 6 at upper end portions and lower end portions of the plurality of through holes 61.

In such a configuration, the fuel gas is supplied to an outer peripheral side of the through holes 61, and the oxidant gas is supplied to an inner peripheral side of the through holes 61. Accordingly, power generation is performed at the side wall portions of the through holes 61, and the output power per projected area on the silicon substrate 2 is increased.

Second Embodiment: Manufacturing Method

FIGS. 24 to 36 are diagrams illustrating an example of a method for manufacturing the fuel cell 1 according to the second embodiment. First, the support material layer 6 is formed on the upper surface and the lower surface of the silicon substrate 2 (FIG. 24). The support material layer 6 is, for example, a silicon nitride film layer. Next, a groove 8 is formed in the support material layer 6 on the upper surface of the silicon substrate 2 (FIG. 25). Next, an electrode material layer 7 is formed such that the groove 8 is completely covered with the electrode material layer (FIG. 26). For the electrode material layer 7, tungsten, silicon doped with impurities, or the like can be used.

Next, the electrode material layer 7 on the support material layer 6 other than that in the groove 8 is removed, so that the electrode material layer 7 remains only in the groove 8 (FIG. 27). For the removal of the electrode material layer, for example, an etch-back method or a chemical mechanical polishing method (CMP method) can be used.

Next, the plurality of through holes 61 perpendicular to the surface of the silicon substrate 2 are formed in a region in which the electrode material layer 7 remains (FIG. 28). A cross-sectional shape of the hole can be, for example, a circle, but can also be an ellipse, or can be a polygon such as a square, a rectangle, a pentagon, or a hexagon.

Next, the lower electrode layer 20 is formed (FIG. 29). The lower electrode layer 20 is formed on the upper surface of the support material layer 6 on the upper surface of the silicon substrate 2, a surface of the electrode material layer 7, the lower surface of the support material layer 6 on the lower surface of the silicon substrate 2, and the side walls of the plurality of through holes 61. The lower electrode layer 20 may be formed of, for example, platinum, or may be formed of a cermet material made of platinum and a metal oxide. For example, the chemical vapor deposition (CVD) method or the atomic layer deposition (ALD) method can be used to form the lower electrode layer 20.

The lower electrode layer 20 formed on each of the side walls of the plurality of through holes 61 is continuous to the lower electrode layer 20 formed on the surface of the electrode material layer 7.

The lower electrode layer 20 is electrically connected to the electrode material layer 7. Although the lower electrode layer 20 is also formed on the upper surface of the support material layer 6, a region in which the lower electrode layer is not formed remains on a part of the upper surface of the support material layer 6 (FIG. 30). This is for bonding to a support substrate in a later step. For removing a part of the lower electrode layer 20, for example, the chemical mechanical polishing method (CMP method) can be used.

Next, a support substrate 102 (second substrate) is prepared (FIG. 31). Silicon, for example, can be used for the support substrate 102. As described above, the fuel cell 1 according to the second embodiment includes the support substrate 102.

Here, in FIGS. 31 to 42, since the silicon substrate 2 is vertically inverted, a positive direction of a Z axis is defined as a lower direction of the drawing. In the following description, the positive direction of the Z axis is referred to as an upper direction, and a negative direction of the Z axis is referred to as the lower direction. Therefore, the upper-lower direction of the drawing in FIGS. 31 to 42 is opposite to the upper-lower direction in the present specification.

Through holes 161 (second through holes) are formed in the support substrate 102. A size of the through hole 161 of the support substrate 102 aligns with the size of the through hole 61 of the silicon substrate 2. The silicon substrate 2 and the support substrate 102 are bonded to each other such that positions of the through holes 61 and the through holes 161 are aligned with and connected to each other.

A through hole 162 (second through hole) and a through hole 163 (second through hole) are formed in the support substrate 102. The through hole 162 is formed at a position corresponding to a part of the silicon substrate 2 in which the electrode material layer 7 is not formed, and the through hole 163 is formed at a position corresponding to a part of the silicon substrate 2 in which the electrode material layer 7 is formed.

A silicon nitride film 103 is formed on the upper surface and the lower surface of the support substrate 102 and side walls of the through holes 161, 162, 163. The silicon nitride film 103 is an insulating film and is formed as a protective film against etching. A plurality of through holes 162 are formed, and one or more through holes 163 are formed. After the support substrate 102 is processed as described above, the silicon substrate 2 in FIG. 30 is vertically inverted and bonded to the support substrate 102 as shown in FIG. 31. Therefore, the plurality of through holes 61 (or at least a part thereof) and the plurality of through holes 161 (or at least a part thereof) are connected to each other.

Next, the solid electrolyte layer 100 and the upper electrode layer 10 are formed (FIG. 32). At this time, the solid electrolyte layer 100 and the upper electrode layer 10 cover the side wall portions of the plurality of through holes 61, side wall portions of the through holes 161, and the lower surface of the support material layer 6 on the lower surface side of the silicon substrate 2. In this example, both the upper electrode layer 10 and the lower electrode layer 20 are formed on the surface parallel to the main surface of the silicon substrate 2. Alternatively, one of the upper electrode layer 10 and the lower electrode layer 20 may be formed on the surface parallel to the main surface of the silicon substrate 2 alone.

The solid electrolyte layer 100 can be formed of, for example, the zirconia thin film doped with yttria. A doping amount of yttria can be, for example, 3% or 8%. For example, the chemical vapor deposition (CVD) method or the atomic layer deposition (ALD) method can be used to form the solid electrolyte layer 100. The solid electrolyte layer 100 is not formed on an exposed surface side (that is, an upper surface side) of the support substrate 102. The film thickness of the solid electrolyte layer 100 can be, for example, 100 nanometers to 1 micrometer.

The upper electrode layer 10 may be formed of, for example, porous platinum, or may be formed of a cermet material made of platinum and a metal oxide. For example, the chemical vapor deposition (CVD) method or the atomic layer deposition (ALD) method can be used to form the upper electrode layer 10. The upper electrode layer 10 is not formed on the exposed surface side (that is, the upper surface side) of the support substrate 102.

In this manner, the membrane electrode assembly is formed on inner peripheral surfaces of the plurality of through holes 61 and at least one side surface (lower surface in the present embodiment) of the support material layer 6. As described above, the membrane electrode assembly is a stacked body including the lower electrode layer 20, the solid electrolyte layer 100, and the upper electrode layer 10.

Next, an electrode material layer 107 is formed in the through hole 163 of the support substrate 102 (FIG. 33). The electrode material layer 107 is electrically connected to the lower electrode layer 20. The electrode material layer 107 is used to connect the lower electrode layer 20 to the wiring.

Next, a part of the support material layer 6 on the silicon substrate 2 that is in the through hole 162 of the support substrate 102 is removed to expose the surface of the silicon substrate 2 (FIG. 34).

Next, a part of the silicon substrate 2 that is exposed via the through hole 162 is removed. For example, a portion in contact with the membrane electrode assembly formed in the plurality of through holes 61 is removed. The removal is performed by partially etching using, for example, a potassium hydroxide (KOH) aqueous solution. Accordingly, the hollow 52 is formed in the silicon substrate 2 (FIG. 35).

Accordingly, a flow path of the fuel gas is formed inside the silicon substrate 2, and the output power per projected area on the silicon substrate 2 is increased. In addition, by particularly removing the portion exposed via the through hole 162, the through hole 162 can be used as the flow path of the fuel gas, so that the manufacturing process is simplified.

The through hole 162 serves as a hollow opening 51 through which the hollow 52 communicates with the outside. As described above, a plurality of through holes (through holes 161, 162 in the present example) are formed, and a part (through hole 161 in the present example) of the plurality of through holes is connected to any one of the through holes 61, and a remaining part (through hole 162 in the present example) of the plurality of through holes is connected to the hollow 52 to be served as the hollow opening 51. With such a configuration, it is possible to form the flow paths for both the fuel gas and the oxidant gas.

The membrane electrode assembly is formed on the side walls of the plurality of through holes 61, and is supported by the support material layer 6 at the upper end portion (that is, an end connected to the through hole 161) and a lower end of the through hole 61.

The lower electrode layer 20, the solid electrolyte layer 100, and the upper electrode layer 10 are each continuous between the plurality of through holes 61 via the lower surface of the silicon substrate 2.

FIG. 36 shows a state in FIG. 35 in cross sections in different directions. FIG. 36 is a cross-sectional view taken along a Z-Y plane perpendicular to a Z-X plane, and particularly is a cross-sectional view at a position in which the hollow opening 51 is present.

The fuel gas is supplied to the lower electrode layer 20 side, and the oxidant gas is supplied to the upper electrode layer 10 side. The lower electrode layer 20 serves as the anode layer, and the upper electrode layer 10 serves as the cathode layer. The supplied fuel gas flows from one hollow opening 51 to another hollow opening 51 through the hollows 52. The fuel gas is supplied to the lower electrode layer 20 at the side wall portions of the through holes 61 inside the hollows 52.

The supplied oxidant gas flows through the plurality of through holes 61 and the through holes 161, and is supplied to the surface of the upper electrode layer 10 on the side wall portions of the through holes 61 in the middle of the flow. The oxidant gas and the fuel gas react with each other by ion conduction via the solid electrolyte layer 100, so that the fuel cell 1 operates in the same manner as a known fuel cell.

As for the supply of the fuel gas and the oxidant gas, contrary to FIG. 36, the oxidant gas may be supplied to the lower electrode layer 20 side, and the fuel gas may be supplied to the upper electrode layer 10 side. The lower electrode layer serves as the cathode layer, and the upper electrode layer serves as the anode layer. In this case, the supplied oxidant gas flows from one hollow opening 51 to another hollow opening 51 through the hollows 52. The oxidant gas is supplied to the lower electrode layer 20 at the side wall portions of the through holes 61 inside the hollows 52.

The supplied fuel gas flows through the plurality of through holes 61 and the through holes 161, and is supplied to the surface of the upper electrode layer 10 on the side wall portions of the through holes 61 in the middle of the flow. Even in this case, the fuel cell 1 operates in the same manner as a known fuel cell.

Second Embodiment: First Modification

FIG. 37 shows a configuration example according to a first modification of the second embodiment. In the second embodiment, the lower electrode layer 20 is also formed on the lower surface side of the silicon substrate 2, similarly to the solid electrolyte layer 100 and the upper electrode layer 10. In the first modification, the lower electrode layer 20 is not formed on the lower surface side of the silicon substrate 2. In a region in which the lower electrode layer 20 is not formed, when the upper electrode layer 10 and the wiring are connected to each other on the lower surface of the silicon substrate 2, even if the solid electrolyte layer 100 is damaged, it is possible to prevent a short circuit between the upper electrode layer 10 and the lower electrode layer 20.

Second Embodiment: Second Modification

FIG. 38 shows a configuration example according to a second modification of the second embodiment. In the second embodiment and the first modification, a thickness of the silicon substrate 2 is the same in a region in which the plurality of through holes 61 are formed and in other regions. In the second modification, the lower surface of the silicon substrate 2 is partially removed in the region in which the plurality of through holes 61 are formed, so that the thickness is reduced. That is, the main surface of the silicon substrate 2 is not flat, and has a shape having a recess in a part of the main surface. As described above, the silicon substrate 2 includes a thick region and a thin region having a thickness less than that of the thick region, and the plurality of through holes 61 are formed in the thin region.

In such a configuration, since a length of the plurality of through holes 61 can be shortened, manufacture can be easily performed. In addition, when the upper electrode layer 10 and the wiring are connected to each other on the lower surface of the silicon substrate 2, the wiring can be connected in the thick region of the silicon substrate 2 while avoiding the thin region (that is, a mechanically weak portion in which the membrane electrode assembly is formed on the side walls of the plurality of through holes 61).

Second Embodiment: Third Modification

FIG. 39 shows a configuration example according to a third modification of the second embodiment. In the second embodiment, the first modification, and the second modification, the membrane electrode assembly is supported by the support material layer 6 only at both end portions of each of the plurality of through holes 61 in the silicon substrate 2. In the third modification, the membrane electrode assembly is supported not only by both end portions of the through hole 61 but also by the side wall portions of the through hole 61.

As shown in FIG. 39, the membrane electrode assembly is supported by the porous support material layer 5 (first support material layer) from an outer peripheral side of the lower electrode layer 20. That is, the side walls of the plurality of through holes 61 each include the porous support material layer 5 supporting the membrane electrode assembly on an outer peripheral side of the side walls.

By not only supporting both ends of the through hole 61 by the support material layer 6, but also forming the porous support material layer 5 on the side wall portions of the through hole 61, mechanical strength around the membrane electrode assembly can be increased. In addition, by using the porous support material layer 5, the fuel gas or the oxidant gas can be supplied to the lower electrode layer 20 by diffusion from a hollow 52 side.

Second Embodiment: Fourth Modification

FIG. 40 shows a configuration example according to a fourth modification of the second embodiment. In the second embodiment and the first to third modifications, the through hole 61 has the same cross-sectional area along an extending direction, that is, the Z direction. In the fourth modification, the cross-sectional area of the through hole 61 changes.

In FIG. 40, the through hole 61 is formed such that a diameter Wt is large on the lower surface side of the silicon substrate 2 and a diameter Wb is small on an upper surface side thereof. Therefore, in the plurality of through holes 61, an opening area in a cross section parallel to the main surface of the silicon substrate 2 decreases from one end portion of the through hole 61 toward the other end portion of the through hole 61.

When the oxidant gas or the fuel gas flows through the through hole 61, the oxidant gas or the fuel gas is consumed in the upper electrode layer 10 along the flow path, and thus, a concentration is high on an intake side (lower surface side), and the concentration is low on an exhaust side (upper surface side). When the concentration is high, a power generation output of the membrane electrode assembly becomes larger. In addition, since the cross-sectional area is large on the intake side, a flow velocity is slow, and since the cross-sectional area is small on the exhaust side, the flow velocity is fast. When the flow velocity is fast, the power generation output of the membrane electrode assembly is further increased.

As described above, since s having a high concentration flows at a low velocity on the intake side and the gas having a low concentration flows at a high velocity on the exhaust side, a change in the power generation output of the membrane electrode assembly is at least partially canceled out, and unevenness in outputs on the intake side and the exhaust side can be prevented.

In FIG. 40, the cross-sectional area of the through hole 61 on the lower surface side of the silicon substrate 2 is large, and the cross-sectional area of the through hole 61 on the upper surface side thereof is small. Conversely, the cross-sectional area of the through hole 61 on the lower surface side of the silicon substrate 2 may be small, and the cross-sectional area of the through hole 61 on the upper surface side thereof may be large. In this case, the oxidant gas or the fuel gas may flow from the upper surface side having a large cross-sectional area.

Second Embodiment: Configuration of Fuel Cell Module

FIG. 41 is a schematic diagram showing a configuration example of a fuel cell module according to the second embodiment. In this example, the thin-film process type of solid oxide fuel cell (SOFC) is used as the fuel cell module.

FIG. 42 is a schematic diagram showing an example of a method for connecting the partition and the fuel cell 1. A gas flow path in the fuel cell module is separated into a flow path for fuel gas and a flow path for oxidant gas.

As shown in FIGS. 41 and 42, the flow path for fuel gas includes a fuel intake, a flow path 251 formed in the partition, and a fuel exhaust. The flow path for oxidant gas includes an air intake, the plurality of through holes 61, the plurality of through holes 161, and an air exhaust. The fuel gas and the oxidant gas are shielded so as not to be mixed in the module. A wiring is led out from an anode electrode and a cathode electrode of the fuel cell 1 by a connector. The connector is connected to an external load.

Comparison Between First Embodiment and Second Embodiment

Since the hole 60 according to the first embodiment is not a through hole, the gas needs to be diffused in order to allow the gas to reach the bottom portion of the hole 60. Therefore, it is suitable for a case in which the size (for example, the depth) of the hole 60 is relatively small. On the other hand, although the through hole 61 is formed in the second embodiment, since the gas needs to pass through the through hole 61, it is suitable for a case in which the size (for example, the diameter) of the through hole 61 is relatively large in consideration of fluid resistance of the gas.

Other Modifications

The invention is not limited to the embodiments and the modifications described above, and includes other various modifications. For example, the above-described embodiments and modifications have been described in detail in order to describe the invention in an easy-to-understand manner, and the invention is not necessarily limited to those including all the configurations described above. A part of a configuration according to one embodiment could be replaced with a configuration according to another embodiment, and the configuration according to one embodiment could be added to the configuration according to another embodiment. In addition, a part of a configuration according to each embodiment may be added to, deleted from, or replaced with another configuration.

For example, the fuel cell module may include a plurality of or all of a region in which the plurality of holes 60 shown in FIG. 5 are formed, a region in which the plurality of columns shown in FIG. 20 are formed, and a region in which the plurality of through holes 61 shown in FIG. 23 are formed.

REFERENCE SIGNS LIST

1 fuel cell
2 silicon substrate (first substrate)
3 insulating film
4 nickel oxide layer (first support material layer, metal-oxide layer)
porous support material layer (first support material layer, metal layer)
6 support material layer (first support material layer)
6a mesh-shaped support material layer (second support material layer)
7, 107 electrode material layer
8 groove
10 upper electrode layer (stacked body)
20 lower electrode layer (stacked body)
40 column (uneven structure)
50 opening
51 hollow opening
52 hollow
60 hole (uneven structure)
61 through hole (first through hole, uneven structure)
70 outer edge of lower electrode layer
100 solid electrolyte layer (stacked body)
102 support substrate (second substrate)
103 silicon nitride film
161, 162, 163 through hole (second through hole)
251 flow path

The invention claimed is:

1. A fuel cell comprising:
a first substrate;
a first support material layer formed on one surface or both surfaces of the first substrate;
a plurality of holes or columns formed in the first support material layer in a manner of extending in a direction perpendicular to a main surface of the first substrate; and
a stacked body formed by a film forming process on a surface of the plurality of holes or columns that is not parallel to the main surface, the stacked body including an upper electrode layer, a solid electrolyte layer, and a lower electrode layer, wherein
the upper electrode layer is also formed on a surface parallel to the main surface on the first support material layer in a manner of being continuous to the upper electrode layer formed in the plurality of holes or columns, and the lower electrode layer is also formed on a surface parallel to the main surface on the first support material layer in a manner of being continuous to the lower electrode layer formed in the plurality of holes or columns, the stacked body is supported by the first support material layer between upper end portions of the plurality of holes and between lower end portions of the plurality of holes, or between upper end portions of the plurality of columns and lower end portions of the plurality of columns,
the plurality of holes or columns include a plurality of first through holes penetrating the first support material layer and the first substrate,
side walls of the plurality of first through holes include the stacked body, and
hollows are formed on outer peripheral sides of the side walls of the plurality of first through holes.

2. The fuel cell according to claim 1, wherein
the plurality of holes or columns include a plurality of bottomed holes formed in the first support material layer,
the first support material layer is a porous support material layer, and
the stacked body is formed on side walls and bottom portions of the plurality of bottomed holes.

3. The fuel cell according to claim 2, wherein
the first support material layer includes a metal layer, and
the lower electrode layer is electrically connected to one side surface of the first substrate via the metal layer and the first substrate.

4. The fuel cell according to claim 2, wherein
in the first support material layer, a surface opposite to a surface on which the plurality of bottomed holes are formed is supported by a second support material layer.

5. The fuel cell according to claim 1, wherein
the plurality of holes or columns include a plurality of columns formed in the first support material layer.

6. The fuel cell according to claim 2, wherein
a thickness of a part of the first support material layer in which the plurality of bottomed holes are formed is constant.

7. The fuel cell according to claim 1, further comprising:
a second substrate supporting the first substrate, wherein
a plurality of second through holes are formed in the second substrate,
the first substrate and the second substrate are bonded to each other, and
a part of the second through holes is connected to any one of the first through holes, and a remaining part of the second through holes is connected to the hollows.

8. The fuel cell according to claim 1, wherein
the first substrate includes a thick region and a thin region having a thickness less than that of the thick region, and
the plurality of first through holes are formed in the thin region.

9. The fuel cell according to claim 1, wherein
the side walls of the plurality of first through holes include a porous support material layer supporting the stacked body on an outer peripheral side of the side walls.

10. The fuel cell according to claim 1, wherein
in the plurality of first through holes, an opening area in a cross section parallel to the main surface decreases from one end portion of the first through hole toward the other end portion of the first through hole.

11. A method for manufacturing a fuel cell, the method comprising:
a step of forming a metal-oxide layer on a surface of a substrate;
a step of forming an uneven structure in the metal-oxide layer;

a step of forming a lower electrode layer, a solid electrolyte layer, and an upper electrode layer in this order on a surface of the uneven structure;

a step of removing a part of the substrate that is in contact with the metal-oxide layer; and a step of making the metal-oxide layer porous by reduction annealing.

12. The method for manufacturing a fuel cell according to claim 11, wherein the uneven structure includes a plurality of bottomed holes or columns formed on a surface of the metal-oxide layer.

13. A method for manufacturing a fuel cell, the method comprising:

a step of forming a first support material layer on both surfaces of a first substrate;

a step of forming a plurality of first through holes penetrating the first substrate and the first support material layer;

a step of forming a stacked body on an inner peripheral surface of the plurality of first through holes and at least one side surface of the first support material layer, the stacked body including a lower electrode layer, a solid electrolyte layer, and an upper electrode layer; and a step of forming a hollow by removing a part of the first substrate that is in contact with the stacked body formed in the plurality of first through holes.

14. The method for manufacturing a fuel cell according to claim 13, further comprising:

a step of forming a plurality of second through holes in a second substrate; and a step of bonding the first substrate and the second substrate and connecting at least a part of the plurality of first through holes and at least a part of the plurality of second through holes, wherein the step of forming the hollow includes a step of removing a part of the first substrate exposed through the second through hole.

* * * * *